US007359564B2

(12) United States Patent
Keam et al.

(10) Patent No.: US 7,359,564 B2
(45) Date of Patent: Apr. 15, 2008

(54) METHOD AND SYSTEM FOR CANCELLATION OF AMBIENT LIGHT USING LIGHT FREQUENCY

(75) Inventors: Nigel S Keam, Redmond, WA (US); Andrew D Wilson, Seattle, WA (US); Donald M Gillett, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 706 days.

(21) Appl. No.: 10/976,483

(22) Filed: Oct. 29, 2004

(65) Prior Publication Data

US 2006/0091288 A1 May 4, 2006

(51) Int. Cl.
*G06K 9/40* (2006.01)
*G06M 7/00* (2006.01)
*G06F 3/042* (2006.01)
*G06K 9/20* (2006.01)

(52) U.S. Cl. .................. 382/254; 250/221; 345/175
(58) Field of Classification Search ............... 382/254, 382/274, 312; 348/187, 188; 250/221; 345/173, 345/175, 183; 235/462; 359/443
See application file for complete search history.

(56) References Cited

U.S. PATENT DOCUMENTS

| | | | | |
|---|---|---|---|---|
| 4,992,650 | A | 2/1991 | Somerville | 235/462 |
| 6,061,177 | A | 5/2000 | Fujimoto | 359/443 |
| 7,176,905 | B2 * | 2/2007 | Baharav et al. | 345/175 |
| 7,184,030 | B2 * | 2/2007 | McCharles et al. | 345/173 |
| 7,232,986 | B2 * | 6/2007 | Worthington et al. | 250/221 |
| 2004/0135825 | A1 | 7/2004 | Brosnan | 345/857 |
| 2005/0178953 | A1 | 8/2005 | Worthington et al. | 250/221 |
| 2005/0219363 | A1 * | 10/2005 | Kohler et al. | 348/187 |

FOREIGN PATENT DOCUMENTS

WO    WO 03/063068    7/2003

OTHER PUBLICATIONS

"3.6 Interpolation in Two or More Dimensions." Numerical Recipes in C: The Art of Scientific Computing. Chapter 3. Interpolation and Extrapolation. © 1988-1992, Cambridge University Press. Numerical Recipes Software. pp. 123-128.
"Bar Code 1, 2-Dimensional Bar Code Page." Available http://www.adams1.com/pub/russadam/stack.html. Printed Jan. 20, 2004. 14pp.
Ambiente article. "InteracTable®." Dated Jul. 7, 2000. Available http://www.darmstadt.gmd.de/ambiente/activities/interactable.html. Printed Nov. 21, 2003. 3pp.

(Continued)

*Primary Examiner*—Yon J. Couso
(74) *Attorney, Agent, or Firm*—Workman Nydegger

(57) ABSTRACT

Compensation of the effects of uncontrolled light in an imaging system using a controlled light source. Light from the controlled light source reflected by an object and uncontrolled light are detected in a plurality of frequency ranges. Intensity of the uncontrolled light is determined based on the varying sensitivity of an image sensor to light in the different frequency ranges and known emission characteristics of the controlled light source in the frequency ranges. Once the intensity of the uncontrolled light is determined, the total light detected at each point is adjusted to reduce the effects of the uncontrolled light in the resulting imaging data produced by the imaging system.

30 Claims, 9 Drawing Sheets

OTHER PUBLICATIONS

Bier, Stone, Pier, Buston, and DeRose. "Toolglass and Magic Lenses: The See-Through Interface." *Proceedings of Siggraph '93* (Anaheim, August). *Computer Graphics Annual Conference Series*, ACM, 1993, pp. 73-80. 8pp.

Blickenstorfer, Conrad H. "First Look: Acer TravelMate TM100 with Windows XP Tablet PC Edition." Pen Computing Magazine. Jul. 2002. pp. 44-47.

"DiamondSpin—Begs for Direct Manipulation Technology Is it the Pen? Sony Leaps Out-of-the-Box Again With Gummi." Mitsubishi/DiamondSpin. CHI 2004 #3. Printed Apr. 30, 2004. 5pp.

Dietz and Leigh. "DiamondTouch: A Multi-User Touch Technology." *UIST '01* Orlando FLA. © ACM 2001 1-58113-438 -x/01/11. CHI Letters 3 (2). Nov. 11-14, 2001. pp. 219-226.

Electronic Check Alliance Processing, Inc. "Gift Cards, How Stored Value Card Systems Work." Available. http://www.electron-cap.com/GiftCards.htm. Printed Jan. 20, 2004 and May 16, 2004. © 2003. 2pp. total (3pp printed).

Fukuchi and Rekimoto. "Interaction Techniques for SmartSkin." *ACM UIST2002 demonstration*, 2002. 2pp.

Grabowski, Robert. "A Miniature Video Laser Range Finder for Small Robots." Available http://www.andrew.cmu.edu/~rig/research/research_hardware/laser_rangefinder.html. Printed May 16, 2004. 8pp.

Grant and Winograd. "Flexible, Collaborative Organization on a Tabletop." *ACM CSCW 2002: Workshop on Co-located Tabletop Collaboration: Technologies and Directions*. New Orleans, LA. Nov. 2002. pp. 1-4.

Horn, Berthold K. P. "Robot Vision." The MIT Press. Available http://mitpress.mit.edu/catalog/item/default.asp?ttype=2&tid=8388. Printed Dec. 17, 2003. 6pp. total.

Horn, Berthold Klaus Paul. "Robot Vision." Binary Images: Topological Properties. The MIT Electrical Engineering and Computer Science Series. 1986. pp. 66-71 and cover page(s).

Hunter, Andrew. "Connected Components Analysis (Computer Vision)." www.google.com search results http://www.google.com/search?sourceid=navclient&q=connected+component+ellipse. Printed Mar. 7, 2004. Article dated Sep. 24, 2002. 2pp search results, 21pp article.

"IR Distance Sensor." Available http://www.diyelectronics.com/Accessories/IRDS.html (2pp) and http://www.diyelectronics.com/Accessories/GP2D05.html (1pg). Printed Dec. 30, 2003. 3pp.

Ishii and Ullmer. "Tangible Bits: Towards Seamless Interfaces between People, Bits and Atoms." *Proceedings of CHI '97*, Mar. 22-27, 1997, Atlanta, Georgia. © 1997 ACM 0-89791-802-9/97/03. pp. 1-8.

Ishii, Wisneski, Orbanes, Chun, and Paradiso. "PingPongPlus: Design of an Athletic-Tangible Interface for Computer-Supported Cooperative Play." *Proceeding of CHI '99*, May 15-20, 1999, © 1999 ACM. pp. 1-8.

Johanson, Kolodny, and Russell. "A Hand pose and Position Tracker for the Interactive Table." CS223B Final Project. Available http://graphics.stanford.edu/~drussel/vision/tracker-report.html. Printed Dec. 16, 2003, 6pp.

Ju, Hurwitz, Judd, and Lee. "CounterActive: An Interactive Cookbook for the Kitchen Counter." *Extended Abstracts of CHI 2001*, Seattle. Apr. 2001. pp. 269-270.

Kang, Sing Bing. "Radial Distortion Snakes." *IAPR Workshop on Machine Vision Applications (MVA2000)*, Tokyo, Japan. Nov. 2000. pp. 603-606.

Kato, Billinghurst, Poupyrev, Imamoto, and Tachibana. "Virtual Object Manipulation on a Table-Top AR Environment." *IEEE and ACM Int'l Symposium on Augmented Reality 2000, ISAR'2000*, Oct. 5-6, 2000, Munich. 9pp.

Klemmer, Newman, and Sapien. "The Designer's Outpost: A Task-Centered Tangible Interface for Web Site Information Design." *Proceedings of Human Factors in Computing Systems: CHI 2000 Extended Abstracts*. The Hague, The Netherlands. Apr. 1-6, 2000. pp. 333-334.

Klemmer, Newman, Farrell, Bilezikjian, and Landay. "The Designers' Outpost: A Tangible Interface for Collaborative Web Site Design." *CHI Letters, The 14th Annual ACM Symposium on User Interface Soft Technology: UIST 2001*. 3(2). pp. 1-10.

Kobayashi, Hirano, Narita, and Ishii. "A Tangible Interface for IP Network Simulation." *CHI 2003*, Apr. 5-10, 2003, Ft. Lauderdale, FL ACM 1-58113-630-7/03/0004. 2pp.

Koike, Sato, and Kobayashi. "Integrating Paper and Digital Information on EnhancedDesk: A Method for Realtime Finger Tracking on an Augmented Desk System." *ACM Transaction on Computer-Human Interaction*, vol. 8 No. 4, Dec. 2001. © 2001 ACM 1073-0516/01/1200-0307. pp. 307-322.

Leibe, Starner, Ribarsky, Wartell, Krum, Singletary, and Hodges. "The Perceptive workbench: Toward Spontaneous and Natural Interaction In Semi-Immersive Virtual Environments." *Proceedings of the IEEE Virtual Reality 2000 Conference*, Mar. 18-22, 2000. New Brunswick, New Jersey: IEEE Computer Society, 2000. 8pp.

Leigh and Dietz. "DiamondTouch Characteristic and Capabilities." Mitsubishi Electric Research Laboratories, Cambridge, Massachusetts, USA. Undated. 2pp.

Magerkurth, Stenzel, and Prante. "STARS—A Ubiquitous Computing Platform for Computer Augmented Tabletop Games." *5th International Conference on Ubiquitous Computing (Ubicomp '03)*, Oct. 12-15, 2003, Seattle, Washington. 2pp.

Malandain, Grégoire. "Connected Components Extraction." Available http://www-sop.inria.fr/epidaure/personnel/malandain/segment/connexe.html. Printed Dec. 18, 2003. 3pp.

Matsushita and Rekimoto. "HoloWall: Designing a Finger, Hand, Body, and Object Sensitive Wall." *UIST '97* Banff, Alberta, Canada. © 1997 ACM 0-89791-881-9/97/10. pp. 209-210.

Missouri Department Of Revenue. "2D Barcode Technology." Undated. 3pp.

Moran, Saund, van Melle, Gujar, Fishkin, and Harrison. "Design and Technology for Collaborage; Collaborative Collages of Information on Physical Walls." *UIST '99*. Asheville, NC. © 1999 ACM 1-58113-075-9/99/11, CHI Letters vol. 1, 1. pp. 197-206.

Pangaro, Maynes-Aminzade, and Ishii. "The Actuated Workbench: Computer-Controlled Actuation in Tabletop Tangible Interfaces." *Proceedings of UIST 2002*, Oct. 27-30, 2002. © 2002 ACM. 10pp.

Paradiso, Hsiao, Strickon, Lifton, and Adler. "Sensor systems for interactive surfaces." *IBM Systems Journal*, vol. 39, Nos. 3&4, 2000. pp. 892-914.

Patten, Ishii, Hines, and Pangaro. "Sensetable: A Wireless Object Tracking Platform for Tangible User Interfaces." *Proceedings of CHI 2001*, Mar. 31-Apr. 5, 2001, ACM Press, © 2001 ACM. 8pp.

Patten, Recht, and Ishii. "Audiopad: A Tag-based Interface for Musical Performance." *Proceedings of Conference on New Interface for Musical Expression (NIME '02)*. Dublin, Ireland, May 24-26, 2002. 6pp.

Ramos and Balakrishnan. "Fluid Interaction Techniques for the Control and Annotation of Digital Video." *UIST '03* Vancouver, B.C., Canada. © 2003 ACM 1-58113-636-06/03/0010. pp. 105-114.

Rekimoto and Ayatsuka. "CyberCode: Designing Augmented Reality Environments with Visual Tags." *Proc. of UIST 2000*, 2000. 10pp.

Rekimoto and Matsushita. "Perceptual Surfaces: Towards a Human and Object Sensitive Interactive Display." *Proceedings of Workshop on Perceptual User Interactes (PUI'97)*, 1997. 3pp.

Rekimoto and Nagao. "The World through the Computer: Computer Augmented Interaction with Real World Environments." *Proceedings of UIST'95*, 1995. pp. 29-36.

Rekimoto and Saitoh. "Augmented Surfaces: A Spatially Continuous Work Space for Hybrid Computing Environments." *CHI '99*, May 15-20, 1999. Pittsburgh, Pennsylvania. © ACM 1999 0-201-48559-1/99/05. pp. 378-385.

Rekimoto, Jun. "Matrix: A Realtime Object Identification and Registration Method for Augmented Reality." *Proc. of Asia Pacific Computer Human Interaction (APCHI '98)*, 1998. 6pp.

Rekimoto, Jun. "Multiple-Computer User Interfaces: 'Beyond the Desktop' Direct Manipulation Environments." *ACI CHI2000 Video Proceedings*, 2000. 2pp.

Rekimoto, Jun. "Pick-and-Drop: A Direct Manipulation Technique for Multiple Computer Environments." *Proceedings of UIST'97*, 1997. pp. 31-39.

Rekimoto, Jun. "SmartSkin: An Infrastructure for Freehand Manipulation on Interactive Surfaces." *CHI 2002*, Apr. 20-25, 2002, Minneapolis, Minnesota. © 2001 ACM 1-58113-453-3/02/0004. 8pp.

Rekimoto, Ullmer, and Oba. "DataTiles: A Modular Platform for Mixed Physical and Graphical Interactions." *SIGCHI'01*, Mar. 31-Apr. 4, 2001, Seattle, WA. © 2001 ACM 1-58113-327-8/01/0003. 8pp.

Reznik, Canny, and Alldrin. "Leaving on a Plane Jet." *2001 Int. Conf. on Intell. Robots & Systems (IROS)*, Maui, Hawaii, Oct. 2001. 6pp.

Ringel, Gerh, Jin, and Winograd. "Barehands: Implement-Free Interaction with a Wall-Mounted Display." Short Talks. *CHI 2001* Mar. 31-Apr. 5. pp. 367-368.

Rosenfeld, Zawadzki, Sudol, and Perlin. "Planar Manipulator Display." New York University mrl. NYU Media Research Lab. Available http://cat.nyu.edu/PMD. Printed May 16, 2004. 3pp.

Rovani, David (Posted by). "My Second Month with the Compaq Tablet." *Home>Reviews*, TablePCHome.com—*Table PC user community*. Posted Apr. 10, 2003. Available http://www.tablepchome.com/Messages.aspx?ThreadID=140. Printed Dec. 30, 2003. pp. 1-2 of 5.

Schmalstieg, Encarnação, and Szalavári. "Using Transparent Props for Interaction With The Virtual Table." Presented at *1999 ACM Symposium on Interactive 3D Graphics (I3DG '99)*. Apr. 26-28, 1999, Atlanta, GA. 7pp.

Scott, Grant, and Mandryk. "System Guidelines for Co-located collaborative Work on a Tabletop Display." *Proceedings of ECSCW'03, European Conference Computer-Supported Cooperative Work 2003*, Helsinki, Finland, Sep. 14-18, 2003. 20pp.

Shen, Everitt, and Ryall. "UbiTable: Impromptu Face-to-Face Collaboration on Horizonatal Interactive Surfaces." © Mitsubishi Electric Research Laboratories, Inc., 2003. Cambridge, Massachusetts. TR-2003-49. Sep. 2003. 10pp.

Shen, Lesh, and Vernier. "Personal Digital Historian: Story Sharing Around the Table." *Interactions*. Mar.+Apr. 2003. pp. 15-22.

Shen, Lesh, Bernier, Forlines, and Frost. "Sharing and Building Digital Group Histories." *CSCW'02*, Nov. 16-20, 2002, New Orleans, Louisianna. © 2002 ACM 1-58113-560-2/02/0011. 10pp.

Shen, Lesh, Moghaddam, Beardsley, and Bardsley. "Personal Digital Historian: User Interface Design." © Mitsubishi Electric Research Laboratories, Inc. 2001. Cambridge, Massachusetts. 5pp.

Shen, Vernier, Forline, and Ringel. "DiamondSpin: An Extensible Toolkit for Around-the-Table Interaction." *CHI 2004*, Apr. 24-29, 2004, Vienna, Austria. © 2004 ACM 1-58113-702-8/04/0004. 8pp.

SMART Technologies Inc. White Paper. "DViT Digital Vision Touch Technology." Feb. 2003. 10pp.

Smart Technologies, Inc. "Rear Projection SMART Board™ Interactive Whiteboard" "SMART Board Software". Available http://www.smarttech.com/Products/rearprojection/index.asp and http://www.smarttech.com/Products/sbsoftware/index.asp. Printed Dec. 16, 2003. 5pp. total.

Starner, Leibe, Singletary, Lyons, Gandy, and Pair. "Towards Augmented Reality Gaming." Available http://www.gvu.gatech.edu/ccg/publications/imagina2000/. Printed Dec. 30, 2003. 27pp.

Streitz, Geißler, Holmer, Konomi, Müller-Tomfelde, Reischl, Rexrogh, Seitz, and Steinmetz. "i-LAND: An interactive Landscape for Creativity and Innovation." *Proceedings of the ACM Conference on Human Factors in Computing Systems (CHI'99)*, Pittsburgh, Pennsylvania, May 15-20, 1999. ACM Press, New York. pp. 120-127.

Symanzik, Jürgen. "Three-Dimensional Statistical Graphics Based On Interactively Animated Anaglyphs." Published 1993. Available http://citeseer.mj.nec.com/95667.html. Printed Feb. 25, 2004. 7pp. total.

"The Tablet PC A detailed look at Microsoft's proposed Tablet PC." *Pen Computing Magazine: Tablet PC*. Available http://www.pencomputing.com/frames/textblock_tablet_pc.html. Printed Dec. 30, 2003. pp. 1.

Tandler, Prante, Müller-Tomfelde, Streitz, and Steinmitz. "ConnecTables: Dynamic Coupling of Displays for the Flexible Creation of Shared Workspaces." *Proceedings of the 14. Annual ACM Symposium on User Interface Software and Technoic (USIT'01)*, ACM Press (CHI Letters 3 (2)), 2001, pp. 11-20 (10pp).

Ullmer and Ishii. "The metaDESK: Models and Prototypes for Tangible User Interfaces." *Proceedings of UIST'97*, Oct. 14-17, 1997. © 1997 ACM—ACM 0-89791-881-9/97/10. 10pp.

Ullmer, Ishii, and Glas. "mediaBlocks: Physical Containers, Transports, and Controls for Online Media." *Computer Graphics Proceedings (SIGGRAPH'98)*, Jul. 19-24, 1998, © 1998 ACM. ACM-0-89791-999-8-8/98/007. 8pp.

Ullmer, Ishii, and Jacob. "Tangible query Interfaces: Physically Constrained Tokens for Manipulating Database Queries." *Proc. INTERACT 2003 Conference*, 2003. 11pp.

Underkoffler and Ishii. "Illuminating Light: An Optical Design Tool with a Luminous-Tangible Interface." *Proceeding of CHI '98*, Apr. 18-23, 1998, © 1998 ACM. pp. 1-8.

Underkoffler and Ishii. "Urp: A Luminous-Tangible Workbench for Urban Planning and Design." *Proceedings of CHI '99*. May 15-20, 1999. © 1998 ACM. pp. 1-8.

Underkoffler, Ullmer, and Ishii. "Emancipated Pixels: Real-World Graphics in the Luminous Room." *Proceedings of SIGGRAPH '99*, Aug. 8-13, 1999, © 1999 ACM. 8pp.

Vernier, Lesh, and Shen. "Visualization Techniques for Circular Tabletop Interfaces." To appear in *Advanced Visual Interfaces*, May 2002, Trento, Italy. © 2002 Mitsubishi Electric Research Laboratories, Inc. MERL-TR2002-01. Authored Mar. 2002. 10pp.

Viola and Jones. "Robust Real-time Object Detection." Cambridge Research Laboratory, Technical Report Series. Compaq. CRL 2001/01, Feb. 2001. 30pp.

"VIRTUALBOARD." Available http://visilab.unime.it/visilab/virtualboard.htm. Printed Dec. 16, 2003. 6pp.

Von Hardenberg and Bérard. Bare-Hand Human-Computer Interaction. *PUI 2001* Orlando, FL, © 2001 ACM 1-58113-448-7-11/14/01. 8pp.

Wellner, Pierre. "Interacting with Paper on the DigitalDesk." *Communications of the ACM*. Jul. 1993. EuroPARC tech report EPC-93-195. 17pp.

Whalen, Tara. "Playing well with Others: Applying Board Game Design to Tabletop Display Interfaces." *UIST 2003*. Vancouver, Nov. 2-5, 2003, 3pp.

Wu and Balakrishnan. "Multi-Finger and Whole Hand Gestural Interaction Techniques for Multi-User Tabletop Displays." *UIST '03*, Vancouver, B.C., Canada. © 2003 ACM 1-58113-636-6/03/0010. pp. 193-202.

\* cited by examiner

METHOD AND SYSTEM FOR CANCELLATION OF AMBIENT LIGHT USING LIGHT FREQUENCY

FIELD OF THE INVENTION

The present invention generally pertains to active imaging, and more specifically, to reducing effects of illumination received from unintended and undesired light sources in a region of interest, to improve the accuracy of the active imaging data.

BACKGROUND OF THE INVENTION

The presence of undesired signals is a concern in the processing of virtually all electromagnetic signals. Even in a relatively simple system, such as a radio receiver, a squelch control is often provided to attenuate signals below a certain magnitude, so as to avoid undesired background static being audible when a signal of interest is not being received. What constitutes undesired background static is for the user to judge, and the user can set the squelch control level to limit the audibility of received signals based on the user's judgment.

Automated signal processing systems, where a computer system autonomously responds to input signals, present a more difficult problem. Unlike the example of a squelch control noted above, where a user can adjust the squelch control level based on experience and judgment, it is more difficult to program a computer system to automatically set a limit to differentiate between certain types of signals that are desirable and those that are not. For example, computers respond well to unambiguous input from keyboards, pointing devices, and similar input devices, but respond less satisfactorily to voice commands. Anyone who has used speech recognition programs has experienced some difficulty when the computer fails to recognize something the user has said. As might be expected, the computer's failure to accurately recognize a user's speech happens more frequently in the presence of background noise or other sounds that affect the overall auditory input perceived by the computer.

Computer vision recognition of objects represents another difficult problem. If the computer must process too much visual data or too broad a range of visual signals, the input will more likely be misread and incorrectly interpreted by the computer. On the other hand, if the computer improperly suppresses visual signals that are needed to properly perceive objects, the computer also may misread visual inputs or ignore important visual input entirely. Computer vision is becoming increasingly more important in making computers and their interfaces even more user friendly. For example, the MIT Media Lab, as reported by Brygg Ullmer and Hiroshi Ishii in "The metaDESK: Models and Prototypes for Tangible User Interfaces, *Proceedings of UIST* 10/1997: 14-17," has developed a form of "keyboardless" human-machine interface that employs computer vision. The metaDESK includes a generally planar graphical surface that not only displays computing system text and graphic output, but also receives user input by "seeing" and responding to an object placed on the graphical surface. The combined object responsive and display capability of the graphical surface of the metaDESK is facilitated using infrared (IR) lamps, a video camera or other image sensor, a video projector, and mirrors disposed beneath the surface of the metaDESK. The mirrors reflect the graphical image projected by the projector onto the underside of the graphical display surface to provide images that are visible to a user from above the graphical display surface. The IR camera can detect IR reflections from the undersurface of an object placed on the graphical surface. By "seeing" and detecting a specially formed object or IR-reflected light from an object disposed on a graphical display surface, the metaDESK can respond to the contemporaneous placement and movement of the object on the display surface, to carryout a predefined function, such as displaying and moving a map of the MIT campus that is displayed on the surface of the metaDESK.

Others have been developing similar keyboardless interfaces. For example, papers published by Jun Rekimoto of the Sony Computer Science Laboratory, Inc., and associates describe a "HoloWall" and a "HoloTable" that display images on a surface and use IR light to detect objects positioned adjacent to the surface.

Both the metaDESK and HoloWall/HoloTable use IR light to see objects and detect the movement of the objects for several reasons. If the systems responded to visible light, the visible light projected by the systems to produce images, which would be partially reflected back by the interactive surface could lead to false readings by the computer vision system. Further, even if such reflections could be suppressed, unless the system were disposed in a dark room, room light and other visible light passing through the interactive display surface would adversely affect the computer vision systems. Furthermore, if such a system were configured to respond to visible light, the system could not produce dark or dim screens because there either would not be sufficient visible light to detect objects and movements, or the light used to detect objects and movement would eclipse the dark or dim images intended for the user to see.

Using IR light or other non-visible light outside the visible spectrum, such as ultraviolet (UV) light, to detect objects placed on an interactive display surface can avoid some of the problems that would arise from attempting to recognize objects with visible light. However, because various visible light sources also produce UV and/or IR light, light from such ambient sources can also adversely impact computer vision systems. For example, incandescent lights, the sun, and a variety of other common sources generate IR and/or UV light. These unintended IR signals, just like unintended visible light signals, can provide undesired input to non-visible-light-sensitive computer vision systems. Band-pass type filters can suppress undesired bandwidths of light generally, but they are not helpful in separating light from a controlled source that is reflected from an object, from ambient light that happens to include non-visible light.

One way to suppress the effects of uncontrolled light sources is to selectively control illumination from a controlled light source, and capture frames of image data with the controlled light source alternately turned on and off. Frames captured with the controlled light source turned off represent data resulting from any uncontrolled light sources that produce non-visible light. Subtracting the light intensity detected in the frames captured with the controlled light source off can thus be used to compensate for the effects of uncontrolled light sources. Such a process is explained in a co-pending, commonly assigned U.S. patent application entitled "method And System For Reducing Effects Of Undesired Signals In An Infrared Imaging System," Ser. No. 10/870,777, filed on Jun. 16, 2004. Such a system may be workable in many contexts.

However, in situations where the imaging system is imaging moving bodies such a time-slicing system may be less optimal. Using such a time-slicing system reduces the effective number of frame capture cycles actually available for data capture. Thus, for example, if a system is configured to capture frames with the controlled light source alternately turned on and then off, the effective capture rate of the imaging system for vision data is only one-half that of a system that is always capturing vision data. For example, alternating the capture of frames with the controlled light source turned on and then off, the effective capture rate of a digital camera capable of capturing 30 frames per second is effectively reduced to 15 frames per second. Moreover, by capturing image data less frequently, the system becomes more susceptible to read errors that may arise when the object being imaged moves during intervals when the controlled light source is turned off. Thus, in an image capture system sampling image data at a reduced rate in order to use a portion of available capture cycles to compensate for ambient light, resulting image data may be choppy, distorted, and/or miss significant object movements.

It is therefore desirable to filter, mask, or otherwise reduce the effects of unintended and undesired light signals, to prevent a vision system from responding to extraneous light signals having light in the same waveband as used by the vision system. The effect of the undesirable background light should be avoided when detecting objects without requiring that a computer vision system be operated in an environment that shields it from all background light sources. Moreover, it is desirable to reduce the effect of light produced by unintended and undesired light sources without sacrificing image capture cycles, which can reduce the ability to accurately capture data resulting from objects moving in the field of interest.

SUMMARY OF THE INVENTION

One of the more important functions of the present invention is to reduce the effects of undesired or uncontrolled light sources in an imaging system, including ambient sources such as sunlight, incandescent light, and other external light sources that produce light including wavebands emitted by s controlled light source. In this invention, imaging data are captured from a region of interest, the imaging data including both light produced by a controlled light source that is reflected by one or more imaged objects, as well as light generated by any uncontrolled sources. The light from the region of interest is sensed by an image sensor used to collect the imaging data and sensitive to light in a plurality of frequency ranges. Knowing variations in the sensitivity of the image sensor to light in different frequency ranges and knowing the emission characteristics of the controlled light source in the frequency ranges, the intensity of the uncontrolled light can be determined and removed from the imaging data.

Accordingly, one aspect of the present invention is directed to a method for reducing effects of uncontrolled light in imaging data. A region of interest is illuminated with controlled light generated by a controlled light source emitting light having known intensities in a plurality of frequency ranges. An image sensing system is positioned to receive light from the region of interest. The image sensor is configured to detect an intensity of light in each of the plurality of frequency ranges, and the different sensitivities of the image sensing system to light received in each of the plurality of frequency ranges is acknowledged. The intensity of received light from the region of interest in each of the plurality of frequency ranges is detected, with the received light including the uncontrolled light and a portion of the controlled light that has been reflected from the region of interest. An intensity of the uncontrolled light included in the received light is computed based on the known intensities of the controlled light source and the intensity of light intensity detected in each of the plurality of frequency ranges. The imaging data is adjusted as a function of the computed intensity of the uncontrolled light to compensate for a contribution of the uncontrolled light to the imaging data.

The controlled light source emits the controlled light in an infrared spectrum, a visible spectrum, or an ultraviolet spectrum. In one embodiment of the present invention, the controlled light source is configured to emit light of approximately equal intensity in each of the frequency ranges.

Detecting the intensity of the received light, computing the intensity of the uncontrolled light, and adjusting the imaging data is performed for each of a plurality of portions comprising the region of interest. In one embodiment of the present invention, the portions of the region of interest include each of the points in the region of interest. Thus, adjusting the imaging data comprises adjusting the imaging data based on the computed intensity of the uncontrolled light by subtracting the computed intensity of the uncontrolled light from an intensity of the received light at each point within the region of interest.

The image sensing system may include a number of different types of sensors. For example, the image sensing system may include a sensor fitted with a mosaic filter, in which the sensor includes plurality of positions each being correlated with filter elements. Each of the filter elements is configured to allow a selected frequency range of light to pass at each of the plurality of positions. Alternatively, the image sensing system may include a plurality of image sensors, where each of the sensors is adapted to receive light in a different frequency range. In addition, the image sensing system may include a sensor fitted with a cycling filter having a plurality of filter elements that allows a particular frequency range to pass during each cycle of the cycling filter. Filter elements may be configured to pass light in red, blue, or green frequency ranges. Also, the image sensing system may include a composite color image sensor having a plurality of detecting cells at each of a plurality of positions, such that each of the detecting cells configured to detect light in a particular frequency range.

In one embodiment of the present invention, the image sensing system includes a digital camera and with a Bayer-type mosaic filter that passes predefined ranges of frequencies of light at each of the plurality of positions where each of the plurality of positions corresponding to a pixel of the digital camera.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

Figure 4A:
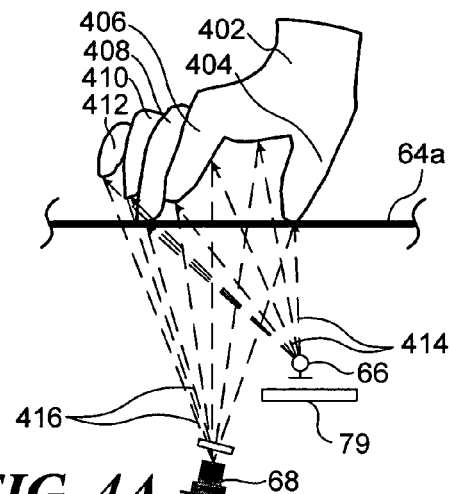
Figure 4B:
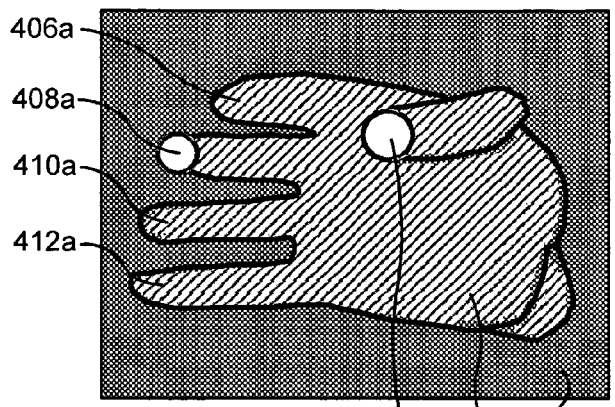
Figure 4C:
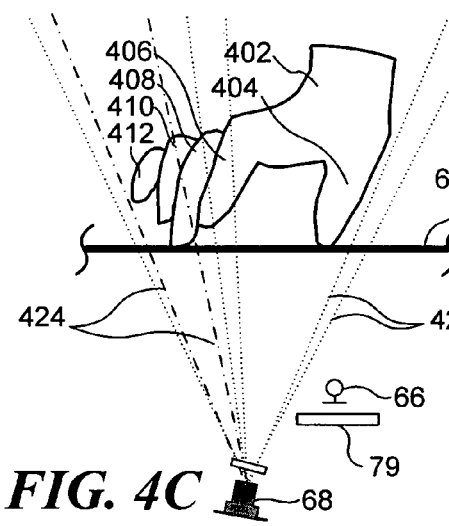
Figure 4D:
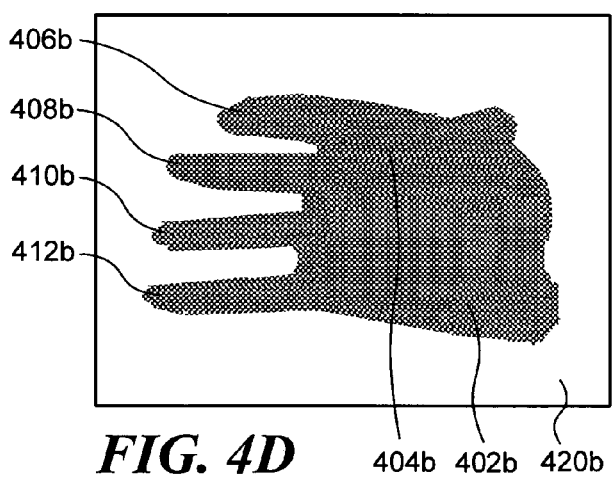
Figure 4E:
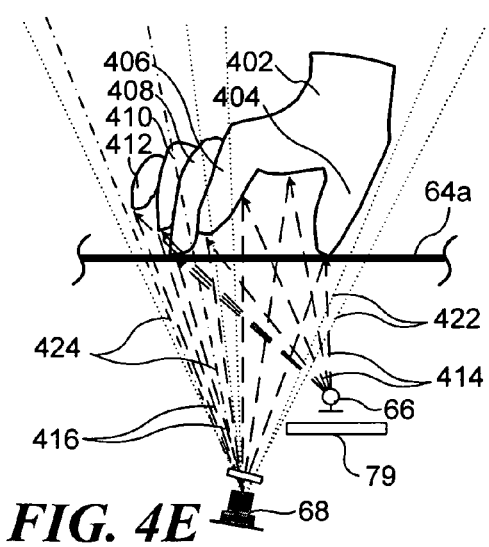
Figure 4F:
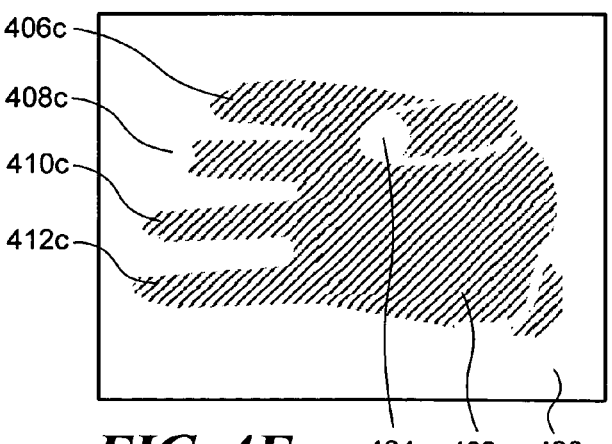
Figure 5:
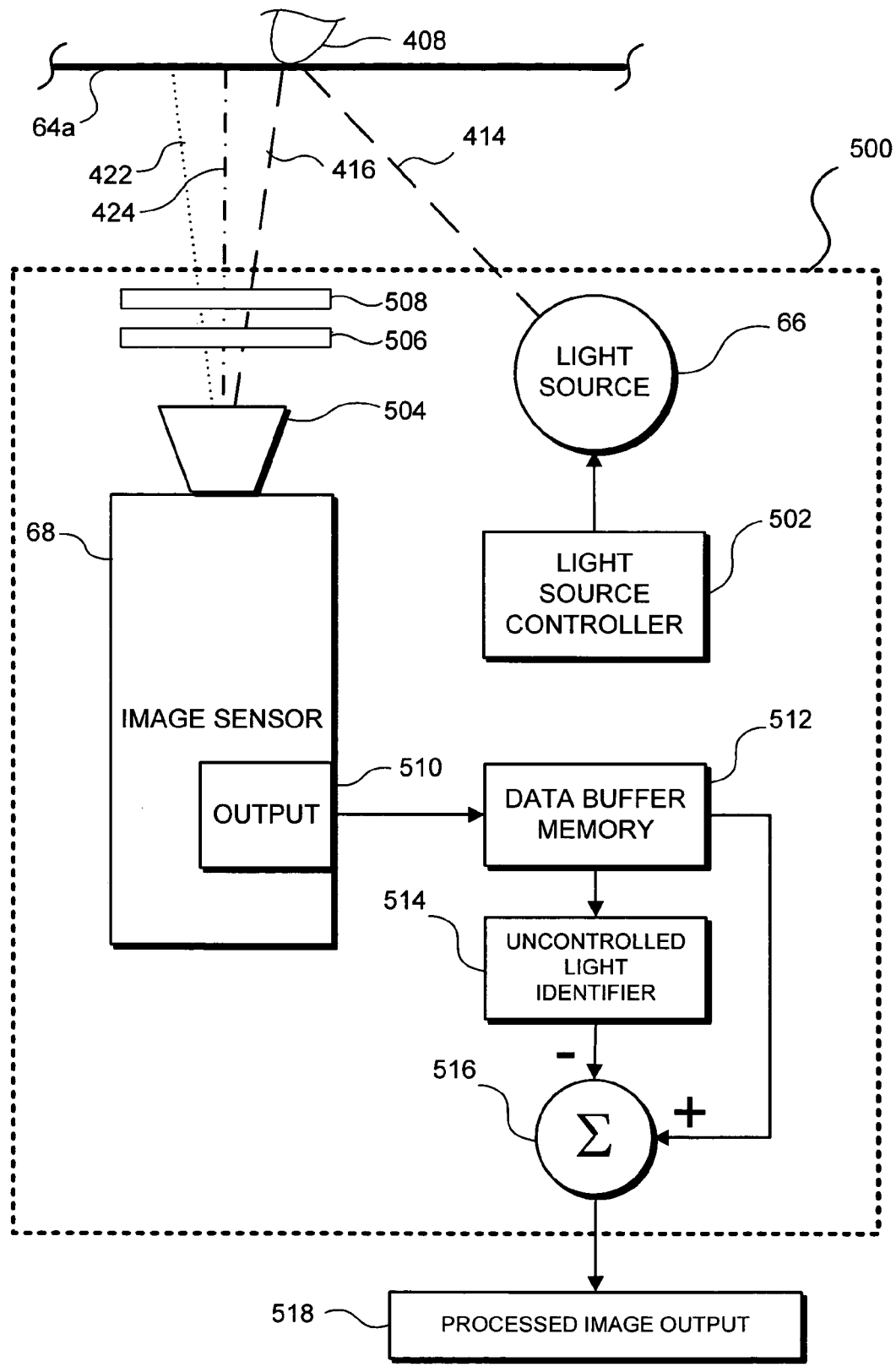
Figure 6:
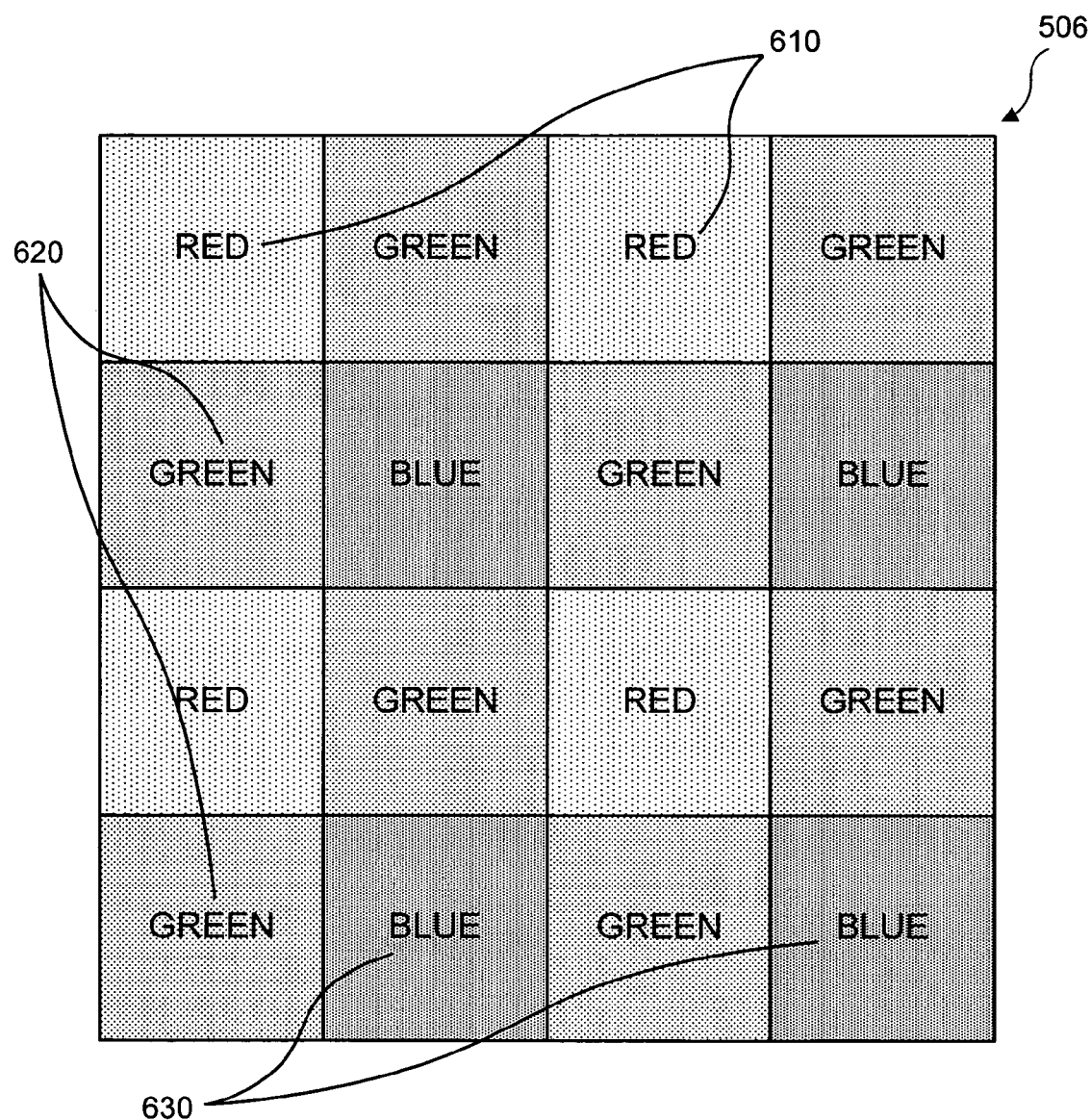
Figure 7:
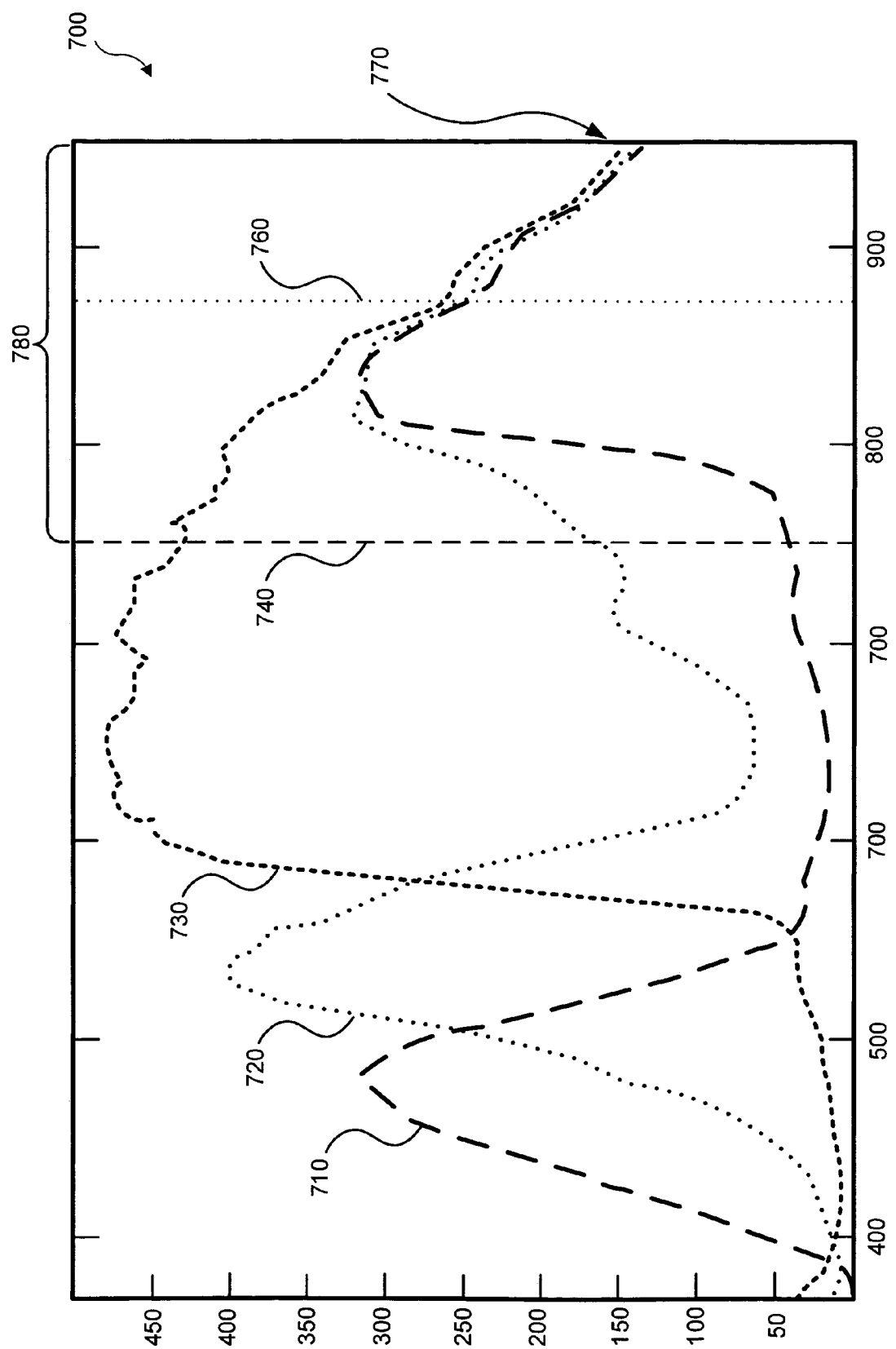
Figure 8A:
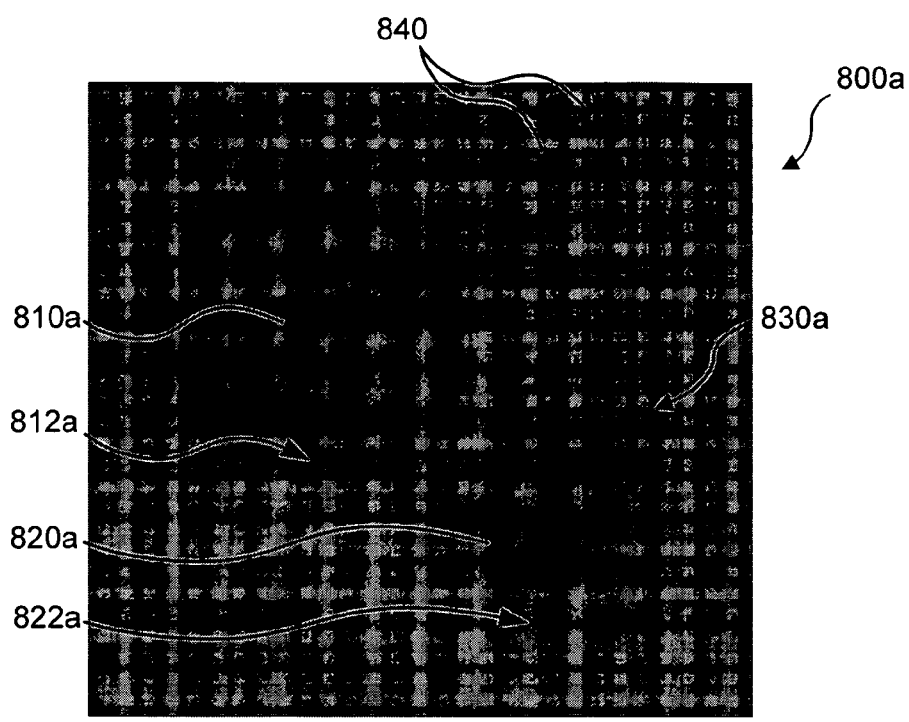
Figure 8B:
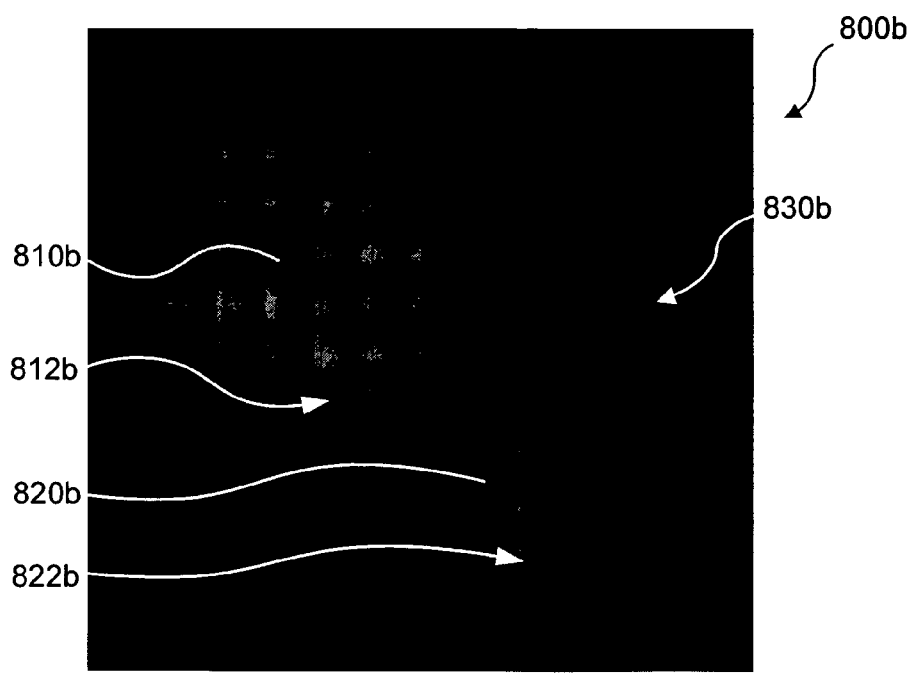
Figure 9:
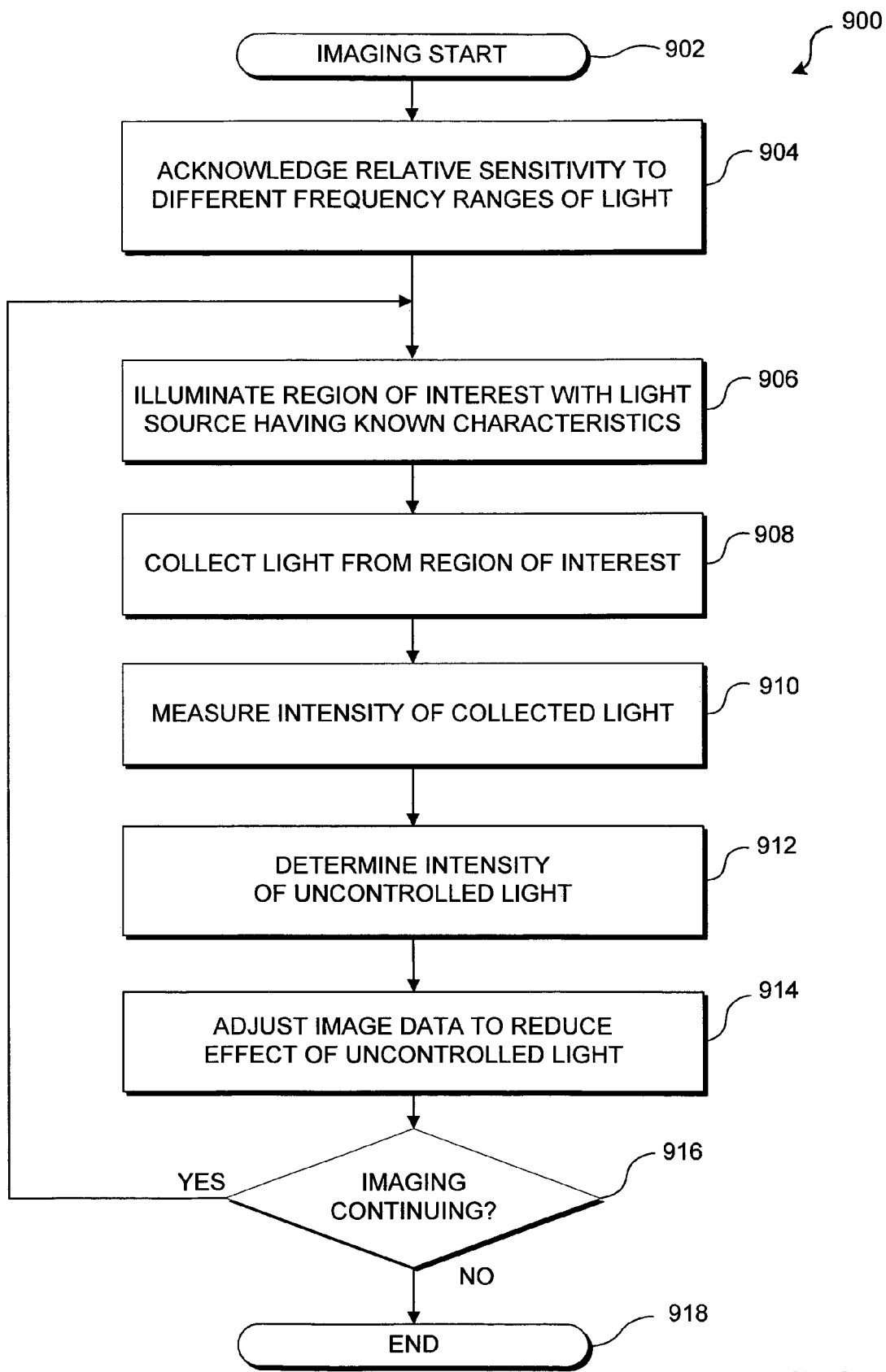

FIGS. 4A, 4C, and 4E each show an enlarged cross-sectional view of a portion of the interactive display surface, with a hand adjacent to the interactive display surface illuminated by light from a controlled light source and/or ambient light, while FIGS. 4B, 4D, and 4F show resulting images captured from the interactive display surface based upon reflected light received from the interactive display surface;

FIG. 5 is a block diagram of a system for reducing the effect of undesired light sources according to an embodiment of the present invention;

FIG. 6 is a section of a representative mosaic Bayer filter that can be employed to filter light received by a light sensor according to one embodiment of the present invention;

FIG. 7 is a graph of the light sensitivity curves for an image sensor that is primarily sensitive to red, green, and blue wavebands but also has sensitivity to infrared wavelengths and the relative sensitivity of the elements covered by different colored filters varies within the infrared region from filter color to filter color depending upon the specific infrared frequency;

FIGS. 8A and 8B are illustrative images produced by an imaging device through a mosaic Bayer filter respectively before and after the images are adjusted for the effects of uncontrolled light sources, based on light frequency; and FIG. 9 is a flow diagram illustrating the logical steps for reducing the effect of undesired illumination according to an embodiment of the present invention.

DESCRIPTION OF THE PREFERRED EMBODIMENT

Exemplary Computing System for Implementing Present Invention

Figure 1:
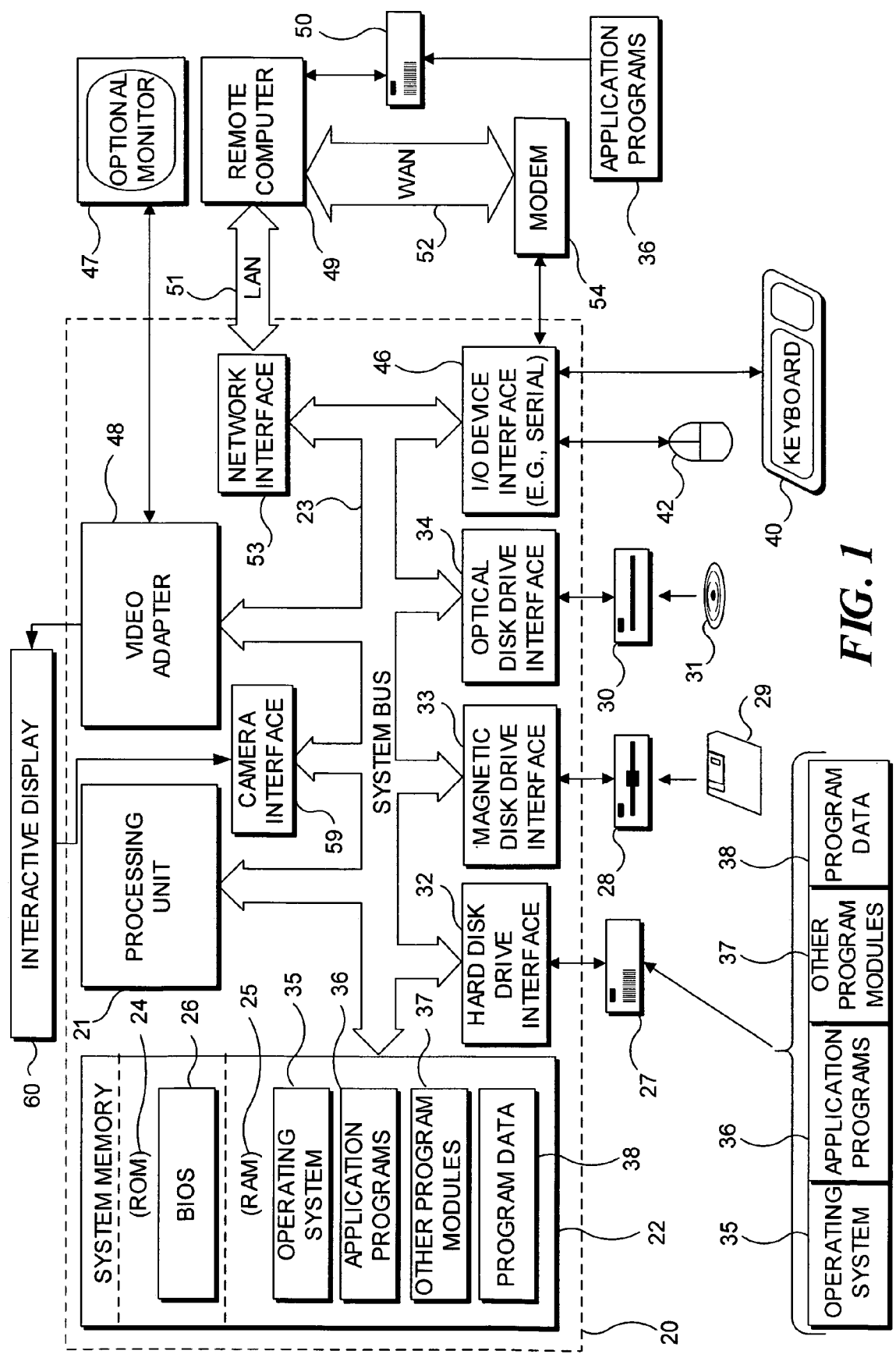
FIG. 1 is a functional block diagram of a generally conventional computing device or personal computer (PC) that is suitable for image processing for the interactive display surface and which is thus useful in practicing the present invention.

With reference to FIG. 1, an exemplary system suitable for implementing various portions of the present invention is shown. The system includes a general purpose computing device in the form of a conventional PC 20, provided with a processing unit 21, a system memory 22, and a system bus 23. The system bus couples various system components including the system memory to processing unit 21 and may be any of several types of bus structures, including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the PC 20, such as during start up, is stored in ROM 24. PC 20 further includes a hard disk drive 27 for reading from and writing to a hard disk (not shown), a magnetic disk drive 28 for reading from or writing to a removable magnetic disk 29, and an optical disk drive 30 for reading from or writing to a removable optical disk 31, such as a compact disk-read only memory (CD-ROM) or other optical media. Hard disk drive 27, magnetic disk drive 28, and optical disk drive 30 are connected to system bus 23 by a hard disk drive interface 32, a magnetic disk drive interface 33, and an optical disk drive interface 34, respectively. The drives and their associated computer readable media provide nonvolatile storage of computer readable machine instructions, data structures, program modules, and other data for PC 20. Although the exemplary environment described herein employs a hard disk, removable magnetic disk 29, and removable optical disk 31, it will be appreciated by those skilled in the art that other types of computer readable media, which can store data and machine instructions that are accessible by a computer, such as magnetic cassettes, flash memory cards, digital video disks (DVDs), Bernoulli cartridges, RAMs, ROMs, and the like, may also be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information in PC 20 and provide control input through input devices, such as a keyboard 40 and a pointing device 42. Pointing device 42 may include a mouse, stylus, wireless remote control, or other pointer, but in connection with the present invention, such conventional pointing devices may be omitted, since the user can employ the interactive display for input and control. As used hereinafter, the term "mouse" is intended to encompass virtually any pointing device that is useful for controlling the position of a cursor on the screen. Other input devices (not shown) may include a microphone, joystick, haptic joystick, yoke, foot pedals, game pad, satellite dish, scanner, or the like. These and other input/output (I/O) devices are often connected to processing unit 21 through an I/O interface 46 that is coupled to the system bus 23. The term I/O interface is intended to encompass each interface specifically used for a serial port, a parallel port, a game port, a keyboard port, and/or a universal serial bus (USB). System bus 23 is also connected to a camera interface 59, which is coupled to an interactive display 60 to receive signals from a digital video camera or comparable image sensor that is included therein, as discussed below. The image sensor may be instead coupled to an appropriate serial I/O port, such as to a USB version 2.0 port. Optionally, a monitor 47 can be connected to system bus 23 via an appropriate interface, such as a video adapter 48; however, the interactive display table of the present invention can provide a much richer display and interact with the user for input of information and control of software applications and is therefore preferably coupled to the video adaptor. It will be appreciated that PCs are often coupled to other peripheral output devices (not shown), such as speakers (through a sound card or other audio interface—not shown) and printers.

The present invention may be practiced on a single machine, although PC 20 can also operate in a networked environment using logical connections to one or more remote computers, such as a remote computer 49. Remote computer 49 may be another PC, a server (which is typically generally configured much like PC 20), a router, a network PC, a peer device, or a satellite or other common network node, and typically includes many or all of the elements described above in connection with PC 20, although only an external memory storage device 50 has been illustrated in FIG. 1. The logical connections depicted in FIG. 1 include a local area network (LAN) 51 and a wide area network (WAN) 52. Such networking environments are common in offices, enterprise wide computer networks, intranets, and the Internet.

When used in a LAN networking environment, PC 20 is connected to LAN 51 through a network interface or adapter 53. When used in a WAN networking environment, PC 20 typically includes a modem 54, or other means such as a cable modem, Digital Subscriber Line (DSL) interface, or an Integrated Service Digital Network (ISDN) interface for establishing communications over WAN 52, such as the Internet. Modem 54, which may be internal or external, is connected to the system bus 23 or coupled to the bus via I/O device interface 46, i.e., through a serial port. In a networked environment, program modules, or portions thereof, used by PC 20 may be stored in the remote memory storage device. It will be appreciated that the network connections shown are exemplary and other means of establishing a communications link between the computers may be used, such as wireless communication and wide band network links.

Exemplary Interactive Surface and Imaging System

Figure 2:
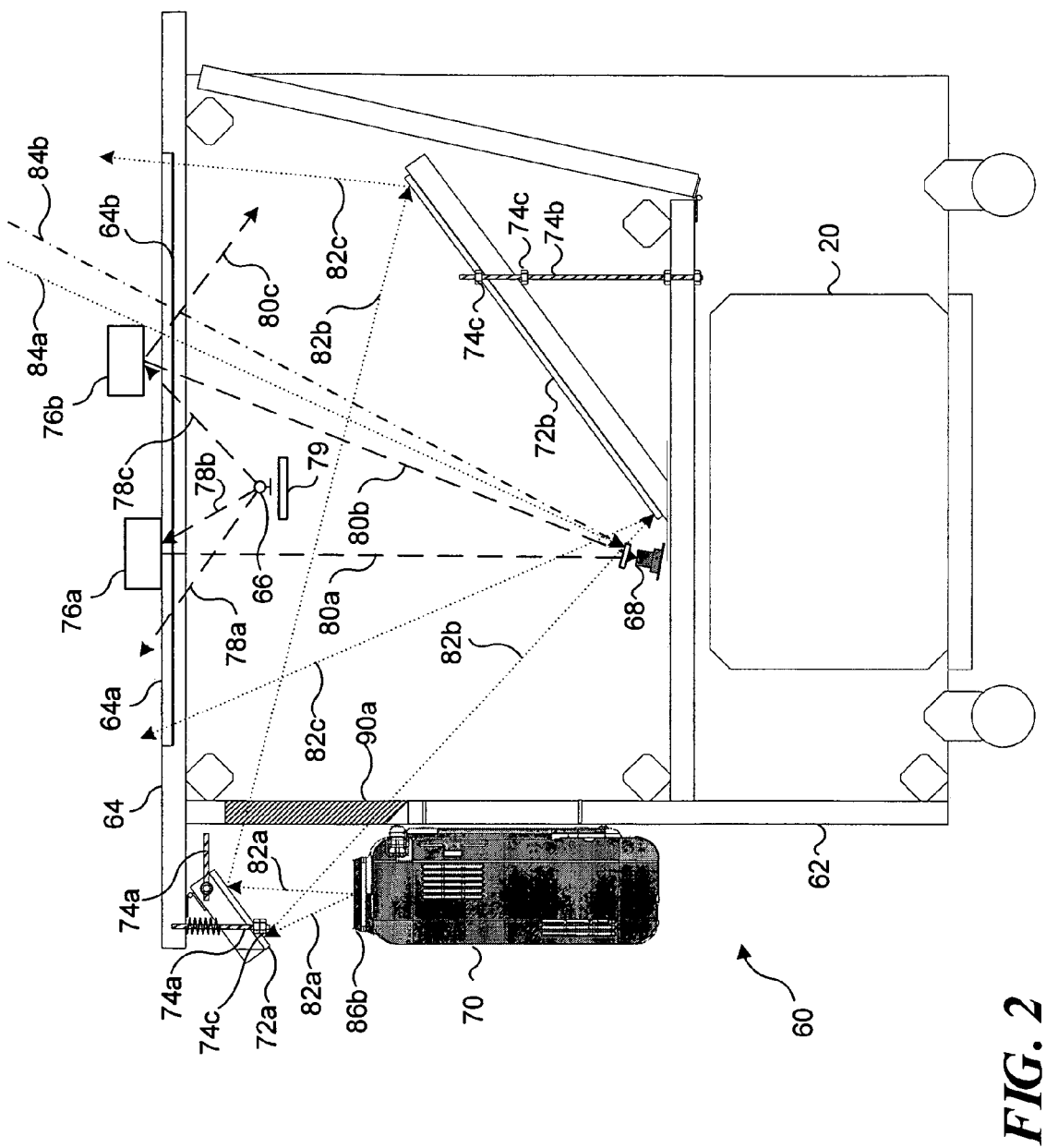
FIG. 2 is a cross-sectional view of one embodiment of an interactive display surface, illustrating internal components.

In FIG. 2, an exemplary interactive display table 60 is shown that includes PC 20 within a frame 62 and which serves as both an optical input and video display device for the computer. In this cut-away Figure of the interactive display table, rays of light used for displaying text and graphic images are generally illustrated using dotted lines, while rays of infrared (IR) light used for sensing objects on or just above a display surface 64a of the interactive display table are illustrated using dash lines. Display surface 64a is set within an upper surface 64 of the interactive display table. The perimeter of the table surface is useful for supporting a user's arms or other objects, including objects that may be used to interact with the graphic images or virtual environment being displayed on display surface 64a. In the embodiment of the invention shown in FIG. 2, the system is configured to image objects adjacent the horizontally-disposed interactive display surface 64a using IR light. However, it should be appreciated that embodiments of the present invention are applicable to imaging in other contexts and using controlled light sources in other spectra, including visible and ultraviolet (UV) light in addition to or instead of IR light.

In the embodiment shown in FIG. 2, IR light sources 66 preferably comprise a plurality of IR light emitting diodes (LEDs) and are mounted on the interior side of frame 62. The IR light that is produced by IR light sources 66 is directed upwardly toward the underside of display surface 64a, as indicated by dash lines 78a, 78b, and 78c. The IR light from IR light sources 66 is reflected from any objects that are atop or proximate to the interactive display surface after passing through a translucent layer 64b of the table, comprising a sheet of vellum or other suitable translucent material with light diffusing properties. Although only one IR source 66 is shown, it will be appreciated that a plurality of such IR sources may be mounted at spaced-apart locations around the interior sides of frame 62 to prove an even illumination of display surface 64a. The infrared light produced by the IR sources may:

exit through the table surface without illuminating any objects, as indicated by dash line 78a;

illuminate objects on the table surface, as indicated by dash line 78b; or illuminate objects a short distance above the table surface but not touching the table surface, as indicated by dash line 78c.

Objects above display surface 64a include a "touch" object 76a that rests atop the interactive display surface and a "hover" object 76b that is close to but not in actual contact with the interactive display surface. As a result of using translucent layer 64b under the interactive display surface to diffuse the IR light passing through the interactive display surface, as an object approaches the top of display surface 64a, the amount of IR light that is reflected by the object increases to a maximum level that is achieved when the object is actually in contact with the interactive display surface.

A digital video camera or comparable image sensor 68 is mounted to frame 62 below display surface 64a in a position appropriate to receive IR light that is reflected from any touch object or hover object disposed above display surface 64a. A baffle 79 is disposed between IR source 66 and image sensor 68 to prevent IR light that is directly emitted from the IR source from entering image sensor 68, because it is preferable that image sensor 68 should produce an output signal that is only responsive to the IR light reflected from objects that are a short distance above or in contact with display surface 64a and corresponds to an image of IR light reflected from objects on or above the interactive display surface. It will be apparent that image sensor 68 will also respond to any IR light included in the ambient light that passes through display surface 64a from above and into the interior of the interactive display (e.g., ambient IR light that also travels along the path indicated by dotted line 84a, along with ambient visible light indicated by dotted line 84b).

IR light reflected from objects on or above the table surface may be:

reflected back through translucent layer 64b, and into the lens of image sensor 68, as indicated by dash lines 80a and 80b; or reflected or absorbed by other interior surfaces within the interactive display without entering the lens of image sensor 68, as indicated by dash line 80c.

Translucent layer 64b diffuses both incident and reflected IR light. Thus, as explained above, "hover" objects that are closer to display surface 64a will reflect more IR light back to image sensor 68 than objects of the same reflectivity that are farther away from the interactive display surface. Image sensor 68 senses the IR light reflected from "touch" and "hover" objects within its imaging field and produces a digital signal corresponding to images of the reflected IR light that is input to PC 20 for processing to determine a location of each such object, and optionally, the size, orientation, and shape of the object. It should be noted that a portion of an object (such as a user's forearm) may be above the table while another portion (such as the user's finger) is in contact with the interactive display surface. In addition, an object may include an IR light reflective pattern or coded identifier (e.g., a bar code) on its bottom surface that is specific to that object or to a class of related objects of which that object is a member. Accordingly, the imaging signal from image sensor 68 can also be used for detecting each such specific object, as well as determining its orientation, based on the IR light reflected from its reflective pattern, in accord with the present invention. The logical steps implemented to carry out this function are explained below.

In accordance with embodiments of the present invention, as described further below, image sensor 68 may be equipped with one or more additional filters, or a plurality of separate cameras or image sensors may be used to capture received light in a plurality of frequency ranges.

Figure 3:
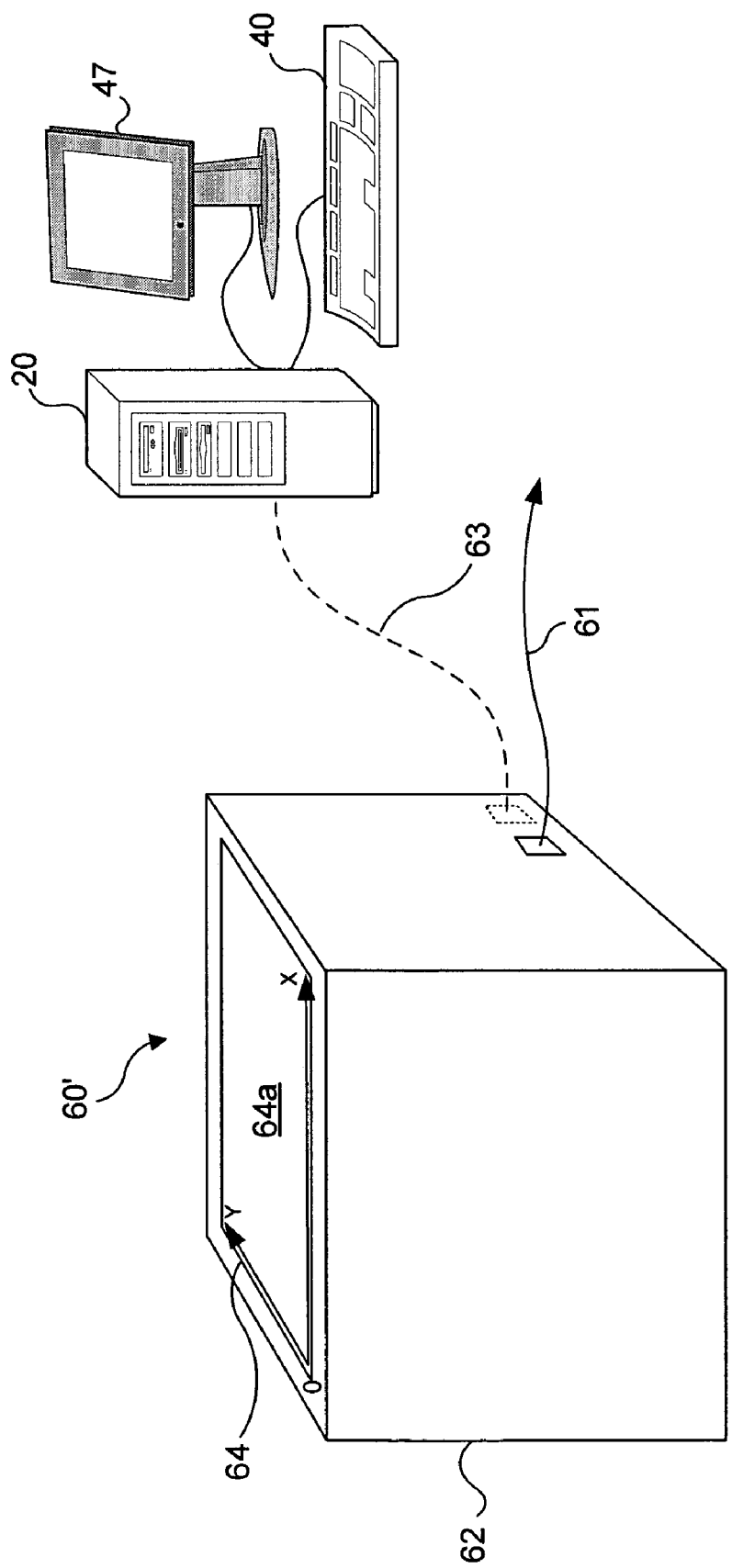
FIG. 3 is an isometric view of an embodiment of the table-type interactive display surface that is coupled to an external PC.

PC 20 may be integral to interactive display table 60 as shown in FIG. 2, or alternatively, may instead be external to the interactive display table, as shown in the embodiment of FIG. 3. In FIG. 3, an interactive display table 60' is connected through a data cable 63 to an external PC 20 (which includes optional monitor 47, as mentioned above). As also shown in this Figure, a set of orthogonal X and Y axes are associated with display surface 64a, as well as an origin indicated by "0." While not specifically shown, it will be appreciated that a plurality of coordinate locations along each orthogonal axis can be employed to indicate any location on display surface 64a.

If the interactive display table is connected to an external PC 20 (as in FIG. 3) or to some other type of external computing device, such as a set top box, video game, laptop computer, or media computer (none shown), then the interactive display table comprises an input/output device. Power for the interactive display table is provided through a power lead 61, which is coupled to a conventional alternating current (AC) line source (not shown). Data cable 63, which connects to interactive display table 60', can be coupled to a USB 2.0 port, an Institute of Electrical and Electronics Engineers (IEEE) 1394 (or Firewire) port, or an Ethernet port on PC 20. It is also contemplated that as the speed of wireless connections continues to improve, the interactive display table might also be connected to a computing device such as PC 20 via such a high speed wireless connection, or via some other appropriate wired or wireless data communication link. Whether included internally as an integral part of the interactive display, or externally, PC 20 executes algorithms for processing the digital images from image sensor 68 and executes software applications that are designed to use the more intuitive user interface functionality of interactive display table 60 to good advantage, as well as executing other software applications that are not specifically designed to make use of such functionality, but can still make good use of the input and output capability of the interactive display table. As yet a further alternative, the interactive display can be coupled to an external computing device, but include an internal computing device for doing image processing and other tasks that would then not be done by the external PC.

An important and powerful feature of the interactive display table (i.e., of either embodiments discussed above) is its ability to display graphic images or a virtual environment for games or other software applications and to enable an interaction between the graphic image or virtual environment visible on display surface 64a and objects that are resting atop the interactive display surface, such as an object 76a, or are hovering just above it, such as an object 76b. It is the ability of the interactive display table to visually detect such objects, as well as the user's finger or other object being moved by the user that greatly facilities this rich interaction.

Again referring to FIG. 2, interactive display table 60 includes a video projector 70 that is used to display graphic images, a virtual environment, or text information on display surface 64a. The video projector is preferably of a liquid crystal display (LCD) or digital light processor (DLP) type, or a liquid crystal on silicon (LCoS) display type, with a resolution of at least 640×480 pixels. An IR cut filter 86b is mounted in front of the projector lens of video projector 70 to prevent IR light emitted by the video projector from entering the interior of the interactive display table where the IR light might interfere with the IR light reflected from object(s) on or above display surface 64a. A first mirror assembly 72a redirects projected light traveling from the projector lens along dotted path 82a along dotted path 82b and through a transparent opening 90a in frame 62, so that the redirected light is incident on a second mirror assembly 72b. Second mirror assembly 72b redirects the projected light along dotted path 82c and onto translucent layer 64b, which is at the focal point of the projector lens, so that the projected image is visible and in focus on display surface 64a for viewing.

Alignment devices 74a and 74b are provided and include threaded rods and rotatable adjustment nuts 74c for adjusting the angles of the first and second mirror assemblies to ensure that the image projected onto the interactive display surface is aligned with the interactive display surface. In addition to directing the projected image in a desired direction, the use of these two mirror assemblies provides a longer path between projector 70 and translucent layer 64b, and more importantly, helps in achieving a desired size and shape of the interactive display table, so that the interactive display table is not too large and is sized and shaped so as to enable the user to sit comfortably next to it.

The foregoing and following discussions describe an interactive display device in the form of interactive display table 60 and 60'. Nevertheless, it is understood that the interactive display surface need not be in the form of a generally horizontal table top. The principles described in this description of the invention suitably also include and apply to display surfaces of different shapes and curvatures and that are mounted in orientations other than horizontal. Thus, although the following description refers to placing physical objects "on" the interactive display surface, physical objects may be placed adjacent to the interactive display surface by placing the physical objects in contact with the interactive display surface, or otherwise adjacent to the interactive display surface.

IR Images Captured with and without a Controlled Ir Source

Extraneous IR light signals should be limited or compensated to prevent these undesired signals from interfering with the functioning of the interactive display table 60. Imaging in wavebands other than the IR range also may be subject to interference from visible, UV, or other light sources. The following discussion focuses on the exemplary case of IR imaging as representative of the problems caused by extraneous light sources that embodiments of the present invention seek to reduce.

FIGS. 4A-4F show a portion of an interactive display table to illustrate how unintended IR signals can distort an IR-spectrum image of a user's hand 402 engaging an interactive surface 64a. FIG. 4A shows user's hand 402 partially touching and partially "hovering" over display surface 64a. An IR imaging system can respond to and differentiate between physical objects touching the interactive display surface and physical objects hovering proximate to the interactive display surface, as described in commonly assigned, co-pending U.S. patent application Ser. No. 10/814,761, entitled "Determining Connectedness And Offset Of 3D Objects Relative To An Interactive Surface," which was filed on Mar. 31, 2004, the specification and drawings of which are hereby specifically incorporated herein by reference.

More particularly, in FIGS. 4A, 4C, and 4E, thumb 404 and middle finger 408 of user's hand 402 are touching interactive display surface 64a, while index finger 406 and ring finger 410 "hover" a short distance above interactive display surface 64a, and little finger 412 hovers slightly further away from interactive display surface 64a.

In FIG. 4A, beams of IR light 414 emanating from IR light source 66 pass through interactive display surface 64a and are incident on user's hand 402. Beams of reflected IR light 416 pass back through interactive display surface 64a, and into Image sensor 68. Image sensor 68 produces a signal corresponding to an image of the IR light entering the camera. This image is a function of IR light beams 416 and any other IR light that reach the Image sensor. In FIG. 4A, the only source of IR light is IR source 66; there are no unintended ambient or extraneous IR light sources in FIG. 4A. Baffle 79 prevents IR light from IR source 66 from directly entering the lens of image sensor 68.

FIG. 4B shows the resulting IR-image of user's hand 402a produced by Image sensor 68 in response only to beams of IR light 416 for IR source 66 that are reflected by user's hand 402. In response to beams of reflected IR light 416, user's hand 402a has a greater intensity or brightness than that of the background 420a in this image. Further, tips of thumb 404a and middle finger 408a have a greater intensity or brightness than the rest of fingers 406a, 410a, and 412a, and the rest of hand 402a, in the image. Tips of thumb 404a and middle finger 408a are the only parts of hand 402a touching display surface 64a (FIG. 4A), so that the IR light reflected from the tips of the thumb and middle finger suffers less reduction due to the diffusion of interactive display surface 64a and therefore have a greater intensity than the rest of hand 402a or background 420a. Although only two distinct intensity levels are shown in FIG. 4B, it will be appreciated, however, that the intensity of the reflected IR light will vary based on the reflectivity of a physical object and its distance from interactive display surface 64a.

In FIG. 4C, IR source 66 is deactivated. Thus, unlike the illustration in FIG. 4A, beams of IR light 414 are not projected toward user's hand 402, and there are no beams of IR light 416 reflected from the user's hand toward Image sensor 68. However, unlike the illustration of FIG. 4A, FIG. 4C shows beams of IR light 422 and 424 originating beyond interactive display surface 64a, which are captured by Image sensor 68. For example, IR beams 422 might represent IR light emanating from any incandescent light source in the ambient environment of the interactive display table, and IR beams 424 might represent beams of IR light included in sunlight illuminating the ambient environment through a window (not shown). Beams of IR light 422 and 424 pass around user's hand 402 and between user's fingers 404-412. The "backlighting" of user's hand 402 therefore results in an image that includes a shadow of user's hand 402 against a brighter background 420b, as shown in FIG. 4D.

In FIG. 4D, user's hand 402 is dark—not bright and illuminated as in FIG. 4B. IR light coming only from behind user's hand 402 appears much brighter than the user's hand in this image, so that the user's hand appears only as a shadow against brighter background 420b. The image of FIG. 4D is understandably like that of a person standing with the sun behind the person, so that the person is backlit by the sun. The diffuse rays of backlighting result in a rather homogeneous shadowy image of the person against a much brighter background. As can be seen in FIG. 4D, there is no distinction between the images of finger tips of thumb 404b and middle finger 408b and the rest of the image of hand 402b and fingers 406b, 410b, and 412b as there is in FIG. 4B. Thus, the backlighting of user's hand with ambient IR light, at a minimum, tends to reduce the contrast between touching and hovering digits and hand, and may substantially reduce the useful image processing of an image that includes user's hand 402. In general, any segmentation of the image, i.e., labeling each pixel as being part of the user's hand or not, or any pixel as part of an object placed on the interactive display surface or not is more difficult under these conditions. The ambient light levels can easily match those of the reflected IR light from the IR light source. In general, although it is possible to read the surface appearance of any object (since the ambient light does not impact the light returned from objects if they are opaque), it is not possible to rely on contours and shapes, or on the absolute pixel intensities in an image as an indication of what object is in contact with the interactive display surface.

In FIG. 4E, IR source 66 is once again activated as in FIG. 4A. This time, however, ambient IR sources are also active, so that, for example, ambient IR light from incandescent light 422 and sunlight 424 are also present. As shown in FIG. 4E, projected beams of IR light 414 reach user's hand 402 and fingers 404-412 from IR source 66, and reflected beams of IR light 416 from the hand and fingers reach Image sensor 68. At the same time, ambient IR light 422 and 424, shining around user's hand 402 and through user's fingers 404-412, also reaches the Image sensor.

The resulting image of FIG. 4F shows that IR light beams 416 reflected from the user's hand and ambient IR light beams 422 and 424 may effectively offset each other. As a result, contrast may be substantially reduced, not only between the tips of user's fingers 404c and 408c touching interactive display 64a and the rest of user's hand 402c and fingers 406c, 410c, and 412c, but in general, between user's hand 402c and fingers 404c-412c, and background 420c. Background 420c will be bright as in FIG. 4D, and the user's fingers 404c and 408c will be discernible, due to the reflected IR from the IR light source. In addition, user's hand 402c will be evident as a shadow relative to the bright ambient background. If beams of reflected IR light 416 from the user's hand are of substantially greater intensity than the beams of ambient IR light 422 and 424, the image of user's hand 402c and fingers 404c-412c still might stand out as brighter than background 420c. Active adjustment of the intensity of IR source 66 would have to be made to account for beams of ambient light 422 and 424 while attempting to preserve contrast between of the tips of fingers 404c and 408c that are touching interactive display surface 64a and the background illuminated by ambient IR light beams 422 and 424.

Accordingly, the present invention compensates for the effects of undesired and/or unintended ambient sources of IR light such as external incandescent light 422 and sunlight 424. Again referring to FIGS. 4B, 4D, and 4E, what is desired is to achieve the equivalent of the image of FIG. 4B, where only reflected beams of IR light 416 (FIG. 4A) are received at image sensor 68. Unfortunately, except by substantially eliminating most of the ambient IR light in the environment, external sources of IR light 422 and 424 will typically be included, along with reflected beams of IR light 416, resulting in an image more like that of FIG. 4F unless the presence of the ambient IR light is compensated. Without providing appropriate compensation, whenever there are ambient IR sources present in the environment, the undesired background in the image of FIG. 4D will always be added to the desired image of IR light reflected from objects as in FIG. 4B, yielding an image with the problems of FIG. 4F.

Adjusting for Uncontrolled Light Based on its Relative Intensity

Embodiments of the present invention seek to derive a more idealized image such as that of FIG. 4B by reducing effects of light received from uncontrolled, extraneous sources, and adjusting the image data to redact the effects of the light received from uncontrolled, extraneous sources. Embodiments of the present invention determine an intensity of uncontrolled light sources by using an image sensor having a varying response to light over a range of frequencies. In one embodiment of the present invention, the image sensor is equipped with a filter that selectively passes red, green, and blue light to discrete pixels, with the pixels having a known relative response to red-, blue-, and green-filtered light at particular wavelengths. A controlled light source is selected such that the light source has a peak intensity at a wavelength in the near-infrared spectrum where pixels of the image sensor have an approximately equal response to red-, blue-, and green-filtered light. As a result, the response of the image sensor to light generated by the light source and reflected by objects being imaged will have a balanced intensity. By contrast, common uncontrolled light, such as sunlight, tungsten-filament bulbs, halogen bulbs, etc., tend to emit light having fairly consistent intensity over a range of near-infrared wavelengths. In one embodiment of the present invention, a bandpass filter is used to restrict the wavelengths of near-infrared light received to a range between a cutoff wavelength of the bandpass filter and a sensitivity attenuation point of the image sensor where the response of the image sensor to the different wavelengths is quantifiable. The image sensor will detect a disparity in intensity caused by the uncontrolled light. Using the known response characteristics of the image sensor to red-, blue-, and green-filtered light, the intensity of the uncontrolled light can be determined, and the image data can then be adjusted to reduce effects of the unwanted, uncontrolled light.

System for Compensating for Uncontrolled Light

FIG. 5 shows a system 500 for reducing the effects of uncontrolled light sources on a computer vision system, according to an embodiment of the present invention. System 500 works with interactive display surface 64a (FIGS. 2 and 3), but can readily be adapted to provide the same benefits for other computer vision systems that employ light in a specific waveband to identify and/or detect the position of objects. PC 20 (shown in FIGS. 1-3) carries out the functions of image processing and provides a processed image output 518. The PC processes the signal produced in response to images sensed by Image sensor 68, for example, to detect the presence and/or movement of a user's finger 408 or other physical object disposed on or adjacent to interactive display surface 64a.

Light source 66, in the embodiment of the invention shown in FIG. 5, is a controlled IR light source. As will be described further below in connection with FIG. 7, light source 66 is selected to have a peak emission intensity relative to the response of the image sensor 68, coupled with filters 506 and/508, to be able to differentiate light reflected from light source 66 from uncontrolled sources.

Light source 66 is configured and positioned to direct light 414 toward interactive display surface 64a and is controlled by a light source controller 502 that energizes light source 66 under control of a PC (not shown, but such as PC 20) or other control system when imaging is being conducted. As will be appreciated, light source controller 502 may be used to deactivate light source 66 if and when it is desired to take readings of uncontrolled, ambient light source 66 inactive for calibration or cross-checking of the responsiveness of image sensor 68, or to deactivate light source 66 when imaging is not being conducted.

Reflected light 416, as well as ambient light that includes incandescent light 422 and sunlight 424 pass through interactive display surface 64a and is detected by a image sensor 68. In the embodiment shown in FIG. 5, image sensor 68 produces a digital output 510 which is then processed as further described below.

In one embodiment of the present invention, image sensor 68 is equipped with a spectral filter 506 and a bandpass filter 508. Bandpass filter 508 can be used to attenuate light below a certain wavelength from being received by image sensor 68 to confine the range of wavelengths of light received to take advantage of the response of image sensor 68 to different wavelengths of light, as will be further described below. In one embodiment of the present invention, spectral filter 506 includes a Bayer filter used to filter light in order to pass light of different wavelengths to different pixels in a two-dimensional array pixel, and spectral filter 506 may be integral to image sensor 68.

Bayer filters are well known to those skilled in the art, to enable monochromatic sensors to record a color image, by producing a red, green, and blue contribution for adjacent pixels locations that are combined to form a colored element in the image. FIG. 6 shows a section of a representative Bayer filter 506 that is usable in an embodiment of the present invention. Bayer filter 506 includes red filtering sections 610, green filtering sections 620, and blue filtering sections 630 configured to pass red, blue, and green light, respectively, to underlying pixels. Using spectral filter 506 results in image sensor 68 having a quantifiable response to light of different wavelengths passed to discrete pixels by spectral filter 506.

FIG. 7 shows a graph 700 of light sensitivity curves for a representative image sensor. In particular, graph 700 shows the responsiveness of a National Semiconductor™ model LM9647 image sensor, which is usable in the present invention. The LM9647 image sensor is primarily sensitive to red, green, and blue wavebands but also has sensitivity to infrared wavelengths. The relative sensitivity of the elements covered by different colored filters varies within the infrared region from filter color to filter color depending upon the specific infrared frequency. The LM9647 image sensor includes an integral Bayer filter of the type illustrated in FIG. 6. Curves 710, 720, and 730 represents the sensitivity of this sensor, through its associated Bayer filter, to blue light, while a curve 720 indicates its sensitivity to blue, green, and red light, respectively. Curves 710-730, although largely disparate across the range of wavelengths represented in FIG. 7, begin to converge at approximately 750 nm, as indicated by a dashed line 740. Curves 710-730 largely do converge at dotted line 760 at approximately 880 nm. The sensitivity of image sensor 68 begins to attenuate substantially at a sensitivity attenuation point 770 at approximately 900 nm.

Thus, range 780, extending between dashed line 740 at 750 nm and sensitivity attenuation point 770 captures, a range where responsiveness of image sensor 68 to red-, green-, and blue-filtered light both varies markedly and converges substantially. Light source 66 (FIG. 5), therefore, is chosen to have a peak intensity of approximately 880 nm where the response of image sensor 68 to red-, green-, and blue-filtered light converges, and bandpass filter 508 is selected to block light at shorter wavelengths below 750 nm.

It will be appreciated that, instead of using an image sensor with a Bayer filter, other systems could be used to detect light in a plurality of frequency ranges. For example, multiple image sensors each bearing a separate, frequency range-specific filter could be used. The separate sensors could receive a portion of the received light via a beam splitter. Thus, for each point at each time, there would be readings in each of the frequency ranges. In addition, a sensor with a color wheel filter or other type of cyclical filter could be used that cycles a different filter element over the entire image sensor during each of a plurality of frame capture intervals. Further alternatively, a multi-color sensitive sensor capable of detecting light in separate frequency ranges at each point also could be used.

Referring back to FIG. 5, in a situation where there was no ambient incandescent light 422 or sunlight 424, the only light collected by image sensor 68 will be light 416 that is reflected by object 408 from light 414 generated by light source 66. By selecting light source 66 to have a peak intensity at a wavelength where image sensor 68 has an equivalent response to red-, green-, and blue-filtered light, when ambient light is not present, pixels associated with filters colors of each type will be balanced. By contrast, ambient incandescent light 422 or sunlight 424 presumably does not have the same peak intensity of light source 66, and light from these uncontrolled sources will be received at wavelengths across range 780. Pixels of image sensor 68 receiving red-, green-, and blue-filtered light will have a varied intensity response as indicated by curves 710-730. Thus, when ambient incandescent light 422 or sunlight 424 is present, by measuring the varying response of pixels receiving red-, green-, and blue-filtered light and exploiting the varying sensitivity of the pixels to light across range 780, intensity of light from sources other than controlled source 66 can be determined. Imaging data can then be adjusted to reduce the effects of light received by image sensor 68 from uncontrolled sources.

Imaging data from output 510 from image sensor 68 is stored in a data buffer memory 512. As is described further below, an uncontrolled light processor or identifier 514 determines the intensity of the uncontrolled light. The intensity of the controlled light is then compensated for that of the uncontrolled light to adjust the imaging data to substantially reduce the effects of the uncontrolled light. The intensity of the uncontrolled light is then arithmetically offset by a summer 516 or similar processor configured to deduct the intensity of the uncontrolled light to yield the adjusted image data, which are generated at processed image output 518. It is understood that some or all of the steps, including data buffer storage, uncontrolled light identification/processing, and/or adjustment of the image data potentially are optionally performed in a suitably configured processor or a computer.

Determining Intensities of Uncontrolled Light

As previously described, embodiments of the present invention use a light source having a known, peak intensity and an image sensor having a varied sensitivity at pixels associated with filters of different colors. Using the variation in how the pixels receiving red-, green-, and blue-filtered light respond, intensity of uncontrolled light received can be determined.

For example, referring back to FIG. 7, intensity of uncontrolled light is determined over range 780 between dashed line 740, which is the cutoff wavelength for bandpass filter 508 where curves 710-730 begin to converge as a function of increasing wavelength but have not yet done so, and attenuation point 770. Analyzing data represented in graph 700, comparing red-filtered light response curve 730 with blue-filtered light response curve 710, the image sensor is approximately 1.6 times more sensitive to red-filtered light than it is to blue-filtered light over range 780. Similarly, comparing green-filtered light response curve 720 with blue-filtered light response curve 710, the image sensor is approximately 1.17 times more sensitive to red-filtered light than it is to blue-filtered light over range 780. Thus, using the example of the image sensor having the responses illustrated in FIG. 7 and using a controlled light source having a peak intensity at a wavelength where the response to differently-filtered light is balanced, the intensity of the uncontrolled light detected can be determined and, thus, offset in the imaging data.

Eq. (1) states the total intensity of red-filtered light received from the controlled source and uncontrolled sources. Because the controlled source has a peak intensity at a wavelength where the response of the image sensor for red-, green-, and blue-filtered light is equivalent, a relative intensity of the controlled light is 1.0. By contrast, relative intensity of light received from uncontrolled sources is 1.6.

Thus:

$$\text{Total}_{Red} = \text{Intensity}_{Controlled} \times 1.0 + \text{Intensity}_{Uncontrolled} \times 1.6 \quad (1)$$

Comparably, Eq. (2) states the relationship of the total intensity of blue-filtered light received from the controlled source and uncontrolled sources:

$$\text{Total}_{Blue} = \text{Intensity}_{Controlled} \times 1.0 + \text{Intensity}_{Uncontrolled} \times 1.0 \quad (2)$$

Eq. (2) is solvable for $\text{Intensity}_{Controlled}$ in Eq. (3):

$$\text{Intensity}_{Controlled} = \text{Total}_{Blue} - \text{Intensity}_{Uncontrolled} \quad (3)$$

Substituting the calculated value of $\text{Intensity}_{Controlled}$ from Eq. (3) into Eq. (1), Eq. (4) shows that Eq. (1) can be solved for $\text{Intensity}_{Uncontrolled}$ as a function of the total light received in the red and blue wavebands:

$$\text{Intensity}_{Uncontrolled} = (\text{Total}_{Red} - \text{Total}_{Blue})/0.6 \quad (4)$$

Thus, based on the known response of the image sensor across the range of interest, intensity of the uncontrolled light can be determined from the total measured intensity of red-filtered light and blue-filtered light measured at each point. In the system described, technically each point or pixel receives only either red-, green-, or blue-filtered light, so the intensity of uncontrolled light at each point is determined using Eq. (4) using the total measured intensity of red-filtered light and blue-filtered light at the two nearest pixels receiving red-filtered light and blue-filtered light, respectively.

Once the intensity of the uncontrolled light has been determined, the intensity of the controlled light at each point, depending on the filtered light received at that point, can be determined from one of Eqs. (5)-(7), depending on whether the point receives red-, green-, or blue-filtered light, respectively:

$$\text{Intensity}_{Controlled} = \text{Total}_{Red} - 1.6 \times \text{Intensity}_{Uncontrolled} \quad (5)$$

$$\text{Intensity}_{Controlled} = \text{Total}_{Green} - 1.17 \times \text{Intensity}_{Uncontrolled} \quad (6)$$

$$\text{Intensity}_{Controlled} = \text{Total}_{Green} - 1.0 \times \text{Intensity}_{Uncontrolled} \quad (7)$$

Embodiments of the present invention can be adapted to image sensors having different responses to filtered light, and similar equations can be derived from the known response of those image sensors to light at different wavelengths. A light source can be selected and/or configured to have a peak intensity suited to the response of the image sensor in the range to be studied.

Image Adjusted for Uncontrolled Light

FIG. 8A shows an original image 800a that has not been processed to reduce effects of uncontrolled light, and FIG. 8B shows an adjusted image 800b in which effects of uncontrolled light have been reduced according to an embodiment of the present invention. In FIG. 8A, original image 800a shows two objects 810a and 820a being imaged. Edges 812a and 822a of objects are rather indistinct against background 830a. Uncontrolled, ambient light entering image 800a from around objects 810a and 820a eliminates contrast that would be present if only controlled light were received to image objects 810a and 820a. Checkerboard pattern 840 is an artifact of mosaic, Bayer filter 506 (FIGS. 5 and 6) and results from the manner in which the filter effects the received light.

Adjusted image 800*b* of FIG. 8B, however, shows images of the same objects 810*b* and 820*b* having sharply contrasting edges 812*b* and 822*b* against a darkened background 830*b*. Using the relative intensity of light received at the sensor through the Bayer filter, the relative intensities of red waveband and blue waveband light have been measured. From those relative intensities, an overall intensity of the uncontrolled, ambient light is determined as described above. Adjusted image 800*b*, therefore, shows how the measurement of the relative light intensities is used to reduce the effects of uncontrolled light, resulting in a clearer image.

Method for Adjusting Image Data to Reduce Effects of Uncontrolled Light Sources

FIG. 9 is a flow diagram 900 illustrating exemplary logical steps for substantially eliminating or reducing the effects of uncontrolled and/or undesired illumination, according to the present invention. At a step 902, imaging of the interactive display surface begins. At a step 904, the relative sensitivity of the image sensor to red-, green-, and blue-filtered light is recognized. As previously described, the relative sensitivity of the image sensor determines the equation usable to derive the intensity of uncontrolled light and, thus, adjust the image to redact the effects of the uncontrolled, ambient light. It will be appreciated that determination of the relative sensitivities of the image sensor need not be performed each time the imaging system is used, but the equations used to determine and account for the effects of uncontrolled light are equipment dependent.

At a step 906, the region of interest is illuminated by the controlled light source. As described above, the controlled light source has a known relative intensity with regard to selected wavebands, such as the red and blue wavebands, which facilitates calculation of the intensity of uncontrolled light. The controlled light source may be activated after measurement of the uncontrolled light, or activated and left active.

At a step 908, light is collected from the region of interest to capture the unprocessed, unadjusted image data, for example, as shown in FIG. 8A. At a step 910, the intensity of the light received at each point is measured. At a step 912, the intensity of uncontrolled light is calculated based on the relative intensities of the red-, green-, or blue-filtered light that was measured at red- and blue-light receiving pixels. At a step 914, the image data is adjusted, point-by-point, to reduce the effects of uncontrolled light. In one embodiment of the present invention, the overall intensity of the uncontrolled light determined at step 912 is subtracted from the measured intensity of the light at each point.

At a decision step 916, it is determined if imaging continues. If so, routine 900 loops to step 906 to continue illuminating and imaging objects in the region of interest. On the other hand, if it is determined at decision step 916 that imaging is not to continue, routine 900 ends at a step 918.

Although the present invention has been described in connection with the preferred form of practicing it and modifications thereto, those of ordinary skill in the art will understand that many other modifications can be made to the present invention within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for reducing effects of uncontrolled light in imaging data, comprising the steps of:
   (a) illuminating a region of interest with controlled light generated by a controlled light source emitting light having known intensities in a plurality of frequency ranges;
   (b) positioning an image sensing system to receive light from the region of interest, the image sensor system being configured to detect an intensity of light in each of the plurality of frequency ranges;
   (c) acknowledging different sensitivities of the image sensing system to light received in each of the plurality of frequency ranges;
   (d) detecting the intensity of received light from the region of interest in each of the plurality of frequency ranges, the received light including the uncontrolled light and a portion of the controlled light that has been reflected from the region of interest; and
   (e) computing an intensity of the uncontrolled light included in the received light based on the known intensities of the controlled light source and the intensity of light intensity detected in each of the plurality of frequency ranges; and
   (f) adjusting the imaging data as a function of the computed intensity of the uncontrolled light to compensate for a contribution of the uncontrolled light to the imaging data.

2. The method of claim 1, wherein the controlled light source emits light in at least one of:
   (a) an infrared spectrum;
   (b) a visible spectrum; and
   (c) an ultraviolet spectrum.

3. The method of claim 1, further comprising configuring the controlled light source such that the controlled light source emits light of approximately equal intensity in each of the plurality of frequency ranges.

4. The method of claim 1, wherein the steps of detecting the intensity of the received light, computing the intensity of the uncontrolled light, and adjusting the imaging data is performed for each of a plurality of portions comprising the region of interest.

5. The method of claim 4, wherein the portions of the region of interest include each of the points in the region of interest.

6. The method of claim 5, wherein the step of adjusting the imaging data comprises the step of adjusting the imaging data based on the computed intensity of the uncontrolled light by subtracting the computed intensity of the uncontrolled light from an intensity of the received light at each point within the region of interest.

7. The method of claim 1, wherein the image sensing system includes one of:
   (a) a detector fitted with a mosaic filter, the detector having a plurality of positions each being correlated with filter elements, each of the filter elements being configured to allow a selected frequency range of light to pass at each of the plurality of positions;
   (b) a plurality of image detectors, each of the detectors being adapted to receive light in a different frequency range; and
   (c) a detector fitted with a cycling filter having a plurality of filter elements allowing a particular frequency range to pass during each cycle of the cycling filter; and (d) a composite color image detector having a plurality of detecting cells at each of a plurality of positions, each of the detecting cells being configured to detect a particular frequency range.

8. The method of claim 7, wherein the filter elements are configured to pass one of:
   (a) a red frequency range;
   (b) a blue frequency range; and
   (c) a green frequency range.

9. The method of claim 7, wherein the detector comprises a digital camera and the mosaic filter includes a Bayer filter that passes predefined frequency ranges of light at each of the plurality of positions, each of the plurality of positions corresponding to a pixel of the digital camera.

10. A method for reducing effects of uncontrolled light in imaging data, comprising the steps of:
   (a) illuminating a region of interest with controlled light generated by a controlled light source emitting light having a consistent intensity over a plurality of frequency ranges;
   (b) positioning an image sensing system to receive light from the region of interest at each of a plurality of positions, the image sensor system being configured to detect an intensity of light in each of the plurality of frequency ranges at each of the plurality of positions;
   (c) acknowledging different sensitivities of the image sensing system to light received in each of the plurality of frequency ranges;
   (d) detecting the intensity of received light from the region of interest in each of the plurality of frequency ranges at each of the plurality of positions, the received light including the uncontrolled light and a portion of the controlled light that has been reflected from the region of interest;
   (e) computing an intensity of the uncontrolled light included in the received light based at each of the plurality of positions based on the consistent intensity of the controlled light source and the intensity of light intensity detected in each of the plurality of frequency ranges at each of the plurality of positions; and
   (f) adjusting the imaging data for each of the plurality of positions as a function of the computed intensity of the uncontrolled light at each of the plurality of positions to compensate for a contribution of the uncontrolled light to the imaging data.

11. The method of claim 10, wherein the controlled light source emits light in at least one of:
   (d) an infrared spectrum;
   (e) a visible spectrum; and
   (f) an ultraviolet spectrum.

12. The method of claim 10, wherein the image sensing system includes one of:
   (a) a detector fitted with a mosaic filter, the sensor having a plurality of positions each being correlated with filter elements, each of the filter elements being configured to allow a selected frequency range of light to pass at each of the plurality of positions;
   (b) a plurality of image sensors, each of the sensors being adapted to receive light in a different frequency range; and
   (c) a sensor fitted with a cycling filter having a plurality of filter elements allowing a particular frequency range to pass during each cycle of the cycling filter; and
   (d) a composite color image sensor having a plurality of detecting cells at each of a plurality of positions, each of the detecting cells being configured to detect a particular frequency range.

13. The method of claim 12, wherein the filter elements are configured to pass one of:
   (a) a red frequency range;
   (b) a blue frequency range; and
   (c) a green frequency range.

14. The method of claim 12, wherein the sensor comprises a digital camera and the mosaic filter includes a Bayer filter that passes predefined frequency ranges of light at each of the plurality of positions, each of the plurality of positions corresponding to a pixel of the digital camera.

15. The method of claim 10, wherein the step of adjusting the imaging data comprises the step of adjusting the imaging data for each of the plurality of positions within the region of interest by subtracting the computed intensity of the uncontrolled light for each position of the region of interest from an intensity of the received light at each position within the region of interest.

16. The method of claim 10, wherein the step of adjusting the imaging data comprises the step of subtracting the computed intensity of the uncontrolled light from an intensity of the received light at each position within the region of interest.

17. A system for reducing effects of uncontrolled light in imaging data, comprising:
   (a) a display surface adjacent to which an object having a marking thereon can be disposed, said display surface displaying images determined by the software application
   (b) a controlled light source disposed to illuminate an object disposed adjacent the interactive display surface, the controlled light source being configured to emit controlled light having known intensities in a plurality of frequency ranges;
   (c) an image sensing system disposed to receive light from the region of interest, the image sensor system being configured to detect an intensity of light in each of the plurality of frequency ranges and having differing sensitivities to light received in each of the plurality of frequency ranges, the received light including the uncontrolled light and a portion of the controlled light that has been reflected from the region of interest;
   (d) a processor in communication with the image sensing system;
   (d) a memory in communication with the processor, the memory storing data and machine instructions that cause the processor to carry out a plurality of functions, including:
      (i) computing an intensity of the uncontrolled light included in the received light based on the known intensities of the controlled light source and the intensity of light intensity detected in each of the plurality of frequency ranges; and
      (ii) adjusting the imaging data as a function of the computed intensity of the uncontrolled light to compensate for a contribution of the uncontrolled light to the imaging data.

18. The system of claim 17, wherein the controlled light is configured to emit light in at least one of:
   (g) an infrared spectrum;
   (h) a visible spectrum; and
   (i) an ultraviolet spectrum.

19. The system of claim 17, wherein the controlled light source is configured to emit light of approximately equal intensity in each of the frequency ranges.

20. The system of claim 17, wherein the intensity of the received light is detected, computing intensity of the uncontrolled light is computed, and the imaging data is adjusted for each plurality of portions comprising the region of interest.

21. The system of claim 20, wherein the portions of the region of interest include each of the points in the region of interest.

22. The system of claim 21, wherein adjusting the imaging data comprises adjusting the imaging data based on the computed intensity of the uncontrolled light by subtracting the computed intensity of the uncontrolled light from an intensity of the received light at each point within the region of interest.

23. The system of claim 17, wherein the image sensing system includes one of:
   (a) a sensor fitted with a mosaic filter, the sensor having a plurality of positions each being correlated with filter elements, each of the filter elements being configured to allow a selected frequency range of light to pass at each of the plurality of positions;
   (b) a plurality of image sensors, each of the sensors being adapted to receive light in a different frequency range; and
   (c) a sensor fitted with a cycling filter having a plurality of filter elements allowing a particular frequency range to pass during each cycle of the cycling filter; and
   (d) a composite color image sensor having a plurality of detecting cells at each of a plurality of positions, each of the detecting cells being configured to detect a particular frequency range.

24. The system of claim 23, wherein the filter elements are configured to pass one of:
   (a) a red frequency range;
   (b) a blue frequency range; and
   (c) a green frequency range.

25. The system of claim 23, wherein the sensor comprises a digital camera and the mosaic filter includes a Bayer filter that passes predefined frequency ranges of light at each of the plurality of positions, each of the plurality of positions corresponding to a pixel of the digital camera.

26. A system for reducing effects of uncontrolled light in imaging data, comprising:
   (a) a display surface adjacent to which an object having a marking thereon can be disposed, said display surface displaying images determined by the software application
   (b) a controlled light source disposed to illuminate an object disposed adjacent the interactive display surface, the controlled light source being configured to emit controlled light having a consistent intensity across a plurality of frequency ranges;
   (c) an image sensing system disposed to receive light from the region of interest, the image sensor system being configured to detect an intensity of light in each of the plurality of frequency ranges at each of a plurality of positions, the received light including the uncontrolled light and a portion of the controlled light that has been reflected from the region of interest;
   (d) a processor in communication with the image sensing system;
   (d) a memory in communication with the processor, the memory storing data and machine instructions that cause the processor to carry out a plurality of functions, including:
      (i) computing an intensity of the uncontrolled light included in the received light at each of the plurality of positions based on the consistent intensity of the controlled light source and the intensity of light intensity detected in each of the plurality of frequency ranges at each of the plurality of positions; and
      (ii) adjusting the imaging data as a function of the computed intensity of the uncontrolled light to compensate for a contribution of the uncontrolled light to the imaging data at each of the plurality of positions.

27. The system of claim 26, wherein the controlled light is configured to emit light in at least one of:
   (j) an infrared spectrum;
   (k) a visible spectrum; and
   (l) an ultraviolet spectrum.

28. The system of claim 26, wherein the image sensing system includes one of:
   (a) a sensor fitted with a mosaic filter, the sensor having a plurality of positions each being correlated with filter elements, each of the filter elements being configured to allow a selected frequency ranges of light to pass at each of the plurality of positions;
   (b) a plurality of image sensors, each of the sensors being adapted to receive light in a different frequency range; and
   (c) a sensor fitted with a cycling filter having a plurality of filter elements allowing a particular frequency range to pass during each cycle of the cycling filter; and
   (d) a composite color image sensor having a plurality of detecting cells at each of a plurality of positions, each of the detecting cells being configured to detect a particular frequency range.

29. The system of claim 28, wherein the filter elements are configured to pass one of:
   (a) a red frequency range;
   (b) a blue frequency range; and
   (c) a green frequency range.

30. The system of claim 28, wherein the sensor comprises a digital camera and the mosaic filter includes a Bayer filter that passes predefined frequency ranges of light at each of the plurality of positions, each of the plurality of positions corresponding to a pixel of the digital camera.

* * * * *